US008341590B1

(12) United States Patent  (10) Patent No.: US 8,341,590 B1
Poole  (45) Date of Patent: Dec. 25, 2012

(54) SYSTEM FOR RELATING WORKFLOW STATUS TO CODE COMPONENT STATUS IN A SOFTWARE PROJECT

(75) Inventor: Damon B. Poole, Westford, MA (US)

(73) Assignee: AccuRev, Inc., Lexington, MA (US)

(*) Notice: Subject to any disclaimer, the term of this patent is extended or adjusted under 35 U.S.C. 154(b) by 1238 days.

(21) Appl. No.: 12/001,710

(22) Filed: Dec. 12, 2007

(51) Int. Cl.
G06F 9/44 (2006.01)
(52) U.S. Cl. .......... 717/101; 717/120; 717/121; 717/122
(58) Field of Classification Search ................. 717/101, 717/120–122
See application file for complete search history.

(56) References Cited

U.S. PATENT DOCUMENTS

| | | |
|---|---|---|
| 4,558,413 A | 12/1985 | Schmidt et al. |
| 4,809,170 A | 2/1989 | Leblang et al. |
| 5,278,979 A | 1/1994 | Foster et al. |
| 5,421,008 A | 5/1995 | Banning et al. |
| 5,428,737 A | 6/1995 | Li et al. |
| 5,428,776 A | 6/1995 | Rothfield |
| 5,553,282 A | 9/1996 | Parrish et al. |
| 5,600,834 A | 2/1997 | Howard |
| 5,649,200 A | 7/1997 | Leblang et al. |
| 5,659,735 A | 8/1997 | Parrish et al. |
| 5,721,900 A | 2/1998 | Banning et al. |
| 5,752,245 A | 5/1998 | Parrish et al. |
| 5,884,306 A | 3/1999 | Bliss et al. |
| 5,903,897 A | 5/1999 | Carrier et al. |
| 5,909,689 A | 6/1999 | Van Ryzin |
| 5,913,063 A | 6/1999 | McGurrin et al. |
| 5,956,513 A | 9/1999 | McLain, Jr. |
| 6,003,034 A | 12/1999 | Tuli |
| 6,055,544 A | 4/2000 | DeRose et al. |
| 6,098,073 A | 8/2000 | O'Rourke |
| 6,216,140 B1 | 4/2001 | Kramer |
| 6,247,047 B1 | 6/2001 | Wolff |
| 6,256,773 B1 | 7/2001 | Bowman-Amuah |
| 6,272,678 B1 | 8/2001 | Imachi et al. |
| 6,487,713 B1 | 11/2002 | Cohen et al. |
| 6,493,732 B2 | 12/2002 | Aoyama et al. |
| 6,502,133 B1 | 12/2002 | Baulier et al. |

(Continued)

OTHER PUBLICATIONS

JIRA, JIRA User's Guide, 2002-2005,JIRA,,http://www.atlassian.com/software/jira/docs/v3.13/jira-manual-user.pdf, p. 1-143.*

(Continued)

*Primary Examiner* — Li B Zhen
*Assistant Examiner* — Duy Khuong Nguyen
(74) *Attorney, Agent, or Firm* — Wolf, Greenfield & Sacks, P.C.

(57) ABSTRACT

Embodiments of the invention are directed to a configuration management (CM) system, method, and product adapted to carry out workflow management tasks, which integrates status of software projects and issues, such that software projects may be more easily and reliably tracked and management of software projects may be streamlined. In some embodiments of the invention, a CM system is adapted to maintain records of software projects and/or issues managed by the CM system, the records comprising an indicator of a workflow progress stage for the project/issue. The CM system may be further adapted to update concurrently and automatically, according to an input from a user, both (1) a workflow progress stage value for the project/issue and (2) a record for software code associated with a project/issue, the record for the software code indicating a version and the project/issue in which the version is included.

31 Claims, 19 Drawing Sheets

U.S. PATENT DOCUMENTS

| | | | |
|---|---|---|---|
| 6,557,012 | B1 | 4/2003 | Arun et al. |
| 6,626,953 | B2 | 9/2003 | Johndrew et al. |
| 6,766,334 | B1 | 7/2004 | Kaler et al. |
| 6,789,252 | B1 | 9/2004 | Burke et al. |
| 6,901,407 | B2 | 5/2005 | Curns et al. |
| 6,978,281 | B1 | 12/2005 | Kruy et al. |
| 7,089,552 | B2 | 8/2006 | Atallah |
| 7,146,608 | B1 | 12/2006 | Newman et al. |
| 7,251,655 | B2 | 7/2007 | Kaler et al. |
| 7,289,973 | B2 | 10/2007 | Kiessig et al. |
| 7,437,722 | B2 | 10/2008 | Poole |
| 7,614,038 | B2 | 11/2009 | Poole |
| 7,769,787 | B2 | 8/2010 | Hailpern et al. |
| 7,856,615 | B2 * | 12/2010 | Clemm et al. ............... 717/101 |
| 8,032,573 | B2 | 10/2011 | Richard |
| 2001/0049697 | A1 | 12/2001 | Johndrew et al. |
| 2002/0062475 | A1 | 5/2002 | Iborra et al. |
| 2002/0091990 | A1 | 7/2002 | Little et al. |
| 2002/0107840 | A1 | 8/2002 | Rishe |
| 2003/0051230 | A1 | 3/2003 | Molchanov et al. |
| 2003/0126003 | A1 | 7/2003 | vom Scheidt et al. |
| 2004/0044996 | A1 | 3/2004 | Atallah |
| 2004/0056903 | A1 | 3/2004 | Sakai |
| 2004/0260693 | A1 | 12/2004 | Chen et al. |
| 2005/0086588 | A1 | 4/2005 | McGregor et al. |
| 2005/0114479 | A1 | 5/2005 | Watson-Luke |
| 2006/0015851 | A1 | 1/2006 | Poole |
| 2006/0031811 | A1 | 2/2006 | Ernst et al. |
| 2006/0070019 | A1 | 3/2006 | Vishnumurty et al. |
| 2006/0150148 | A1 | 7/2006 | Beckett et al. |
| 2007/0011649 | A1 | 1/2007 | Venolia |
| 2007/0118888 | A1 | 5/2007 | Styles |
| 2008/0098037 | A1 | 4/2008 | Neil et al. |
| 2009/0307650 | A1 | 12/2009 | Saraf et al. |

OTHER PUBLICATIONS

JIRA, JIRA Documentation, 2002-2005,JIRA, http://www.usit.uio.no/prosjekter/gorilla/doku/jira-manual.pdf, p. 1-376.*

Leblang, "Managing the Software Development Process with ClearGuide", May 1997, p. 66-80.*

Office Action dated Aug. 31, 2010 from Co-pending U.S. Appl. No. 12/001,708.

Massari et al. "Supporting Mobile Database Access Through Query by Icons," Distributed and Parallel Databases, 4:249-269 (1996).

Office Action dated Mar. 4, 2010 from Co-Pending U.S. Appl. No. 12/001,708.

Office Action from U.S. Appl. No. 12/551,923 dated Mar. 26, 2012.

Office Action dated Oct. 25, 2011 from Co-Pending U.S. Appl. No. 12/059,529.

Office Action dated Mar. 9, 2011 from Co-Pending U.S. Appl. No. 12/001,708.

Office Action dated Aug. 31, 2011 from Co-Pending U.S. Appl. No. 12/001,708.

Poole et al., "Stream-Based Architecture for SCM," Jun. 6, 2005 AccuRev., available at: http://www.accurev.com/whitepaper/pdf/accurev_streams.pdf.

Office Action from U.S. Appl. No. 12/059,529 dated Feb. 13, 2012.

* cited by examiner

| Issue | Issue name | Issue description | Assigned To | Target |
|---|---|---|---|---|
| 1 | Memory leak | GUI does not fully release memory | Dev 1 | Project A |
| 2 | Multiple projects | Software only supports one project; next release support two projects | Dev 5 | Project B |
| 3 | Startup slow | Software is slow to start | Dev 2 | Project A |
| 4 | Colors | Default color scheme for UI is too bright | Dev 1 | Project A |
| . . . | | | | |

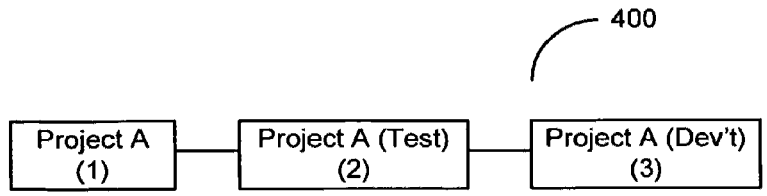
FIG. 4A
— 402
| Issue | Issue name | Issue description | Assigned To | Target |
|---|---|---|---|---|
| 1 | Memory leak | GUI does not fully release memory | Dev 1 | Project A |
| 3 | Startup slow | Software is slow to start | Dev 2 | Project A |
FIG. 4B
— 404
| CPK | EID | Version | Basis |
|---|---|---|---|
| 1 | 5 | 3/2 | 3/1 |
| 1 | 6 | 3/2 | 3/1 |
| 1 | 7 | 3/2 | 3/1 |
| 3 | 1 | 3/1 | 3/1 |
FIG. 4C
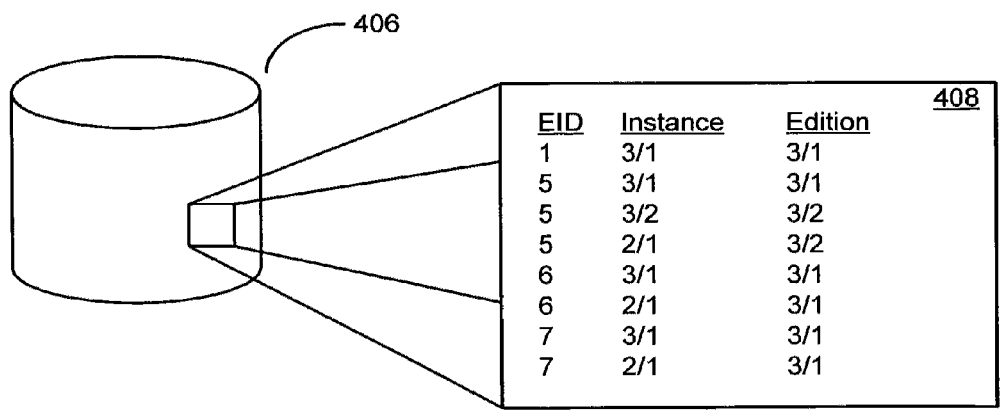
FIG. 4D

1600

```
1   <workflowLinks>
2       <project id="5">
3           <stream purpose="source" id="19">
4               <link>
5                   <transition name="Complete"/>
6                   <stream purpose="destination" id="18"/>
7                   <stage id="3">
8               </link>
9           </stream>
10          <stream purpose="source" id="18">
11              <link>
12                  <transition name="Verify"/>
13                  <stream purpose="destination" id="5"/>
14                  <stage id="4"/>
15              </link>
16          </stream>
17      </project>
18  </workflowLinks>
```

FIG. 16

```
                                    ┌─1720
Issue  Issue description             Assigned To  Target     Status
1      GUI does not fully release memory  Dev 1        Project A  In Dvt
3      Software is slow to start     Dev 2        Project A  Closed
```

FIG. 17A

```
                                    ┌─1722
Issue  Issue description             Assigned To  Target     Status
1      GUI does not fully release memory  Dev 1        Project A  Implemented
3      Software is slow to start     Dev 2        Project A  Closed
```

FIG. 17B

```
                ┌─1724
EID   Stream ID   Instance ID   Real Stream ID   Edition ID
2     4           1             4                1
```

FIG. 17C

```
                ┌─1726
EID   Stream ID   Instance ID   Real Stream ID   Edition ID
2     4           1             4                1
2     3           1             4                1
```

FIG. 17D

SYSTEM FOR RELATING WORKFLOW STATUS TO CODE COMPONENT STATUS IN A SOFTWARE PROJECT

BACKGROUND OF INVENTION

1. Field of Invention

The present invention relates to processes and systems for managing software development projects and the workflows employed to oversee such projects. More particularly, embodiments of the invention provide processes and systems for relating a workflow status for a software project to the status of software components of the software project.

2. Discussion of Related Art

Developing software applications and products (which includes both initial development and later modifying or adding to the initial development) often requires the coordinated efforts of many developers (e.g., software programmers). This coordinated effort is referred to herein as a "software development effort" or "development effort," and a body of work (e.g., one or more software products, including software applications) being developed by the effort is referred to as a "software development project," "software project," or "project." A software development effort may comprise one or more software projects. At any given time, as part of a software development effort, multiple developers may be working on different software components of a software development project and/or different versions of these software components (e.g., for different users or situations). Thus, there may be multiple concurrent software development efforts ongoing, at least some of which use or involve the modification of common software components, including different versions of those software components and sometimes multiple versions of components. Frequently, a software development project may involve several, or even dozens or more, of developers and managers, and from a few to even hundreds of software components. Managing one or more software development projects and the concurrent development of these different software components and versions is commonly referred to as configuration management (CM). Computers or computer systems running CM software applications (i.e., programs) assist developers and project managers in the complex task of managing a software development project, including maintaining coherency between different software components and versions. (Hereafter, the term "CM application" may be used to refer to such computers or computer systems, or to a CM program for executing on a computer or computer system.)

A software development effort most often involves adding or improving functionality (i.e., adding features) to a product, and fixing functionality that is not working properly (i.e., fixing defects or "bugs"). Sometimes, a software development effort may involve removing functionality from a product, such as when a customer desires a simplified version of the product. Typically, one or more fixes, feature changes (whether additions, deletions, or a combination), or combinations thereof (each a development "item") are grouped together as a development unit called an "issue." At a minimum, an issue is defined by one or more development items, and often includes other information, such as information which may be used to identify a developer working on the issue and/or a software project with which the issue is associated (i.e., a "Target Release" for the issue). The statuses of issues are often tracked as part of a development effort (often with CM software), as an aid to management of the development process; accordingly, tracking information may be added to an issue description. Upon completion, the tracking information (i.e., tracked statuses) may indicate that the issue has been resolved or finished.

A software development effort may comprise any number of issues, with a software project of the software development effort comprising a single issue—in which case the software project may be considered to be the issue—or comprising multiple issues.

Because of the often significant numbers of issues involved in a development effort (which may number in the dozens, hundreds, or thousands), efficient management of development efforts typically relies on use of an issue tracking system to track the progress of the resolution of each issue. Often, tracking systems are implemented using a computer system, for example, as part of a CM application. Such computerized tracking systems may provide a unique identifier (e.g., a serial number) for each issue, and provide data fields that enable a user (e.g., a developer, supervisor, or project team leader) to track the progress of the issue's resolution by indicating status changes and the like (e.g., when the issue is assigned to a particular developer to be completed, when it is sent to the quality assurance (QA) team for testing, or when it is declared tested and complete, etc.), from time to time, and to identify who is responsible for addressing each issue.

As described above, a software development effort, or concurrent efforts, often involves multiple developers working concurrently on different versions of the same and different software components. Some CM applications provide each developer a "workspace" (defined below) in which the developer can add, modify, and delete components of a software project pertinent to the developer's objective (e.g., completion of an issue). Further, a CM application may maintain one or more versions of the project itself (e.g., branches or streams—defined below), and a developer's workspace may be configured to enable the developer to make changes to a particular version of the project. As used herein, a "version" of a software development project (or other software entity) is a set of software components of the project, and for each software component, a version (i.e., instantiation as of a specific date and time) thereof. It should be appreciated that different versions of a software project (or other type of software entity) may have much the same content (e.g., may include much the same set of software component versions) or quite different content. A developer's workspace may be considered a version of the project or as containing a version of the project.

It is often desirable to propagate modifications made in a developer's workspace (e.g., an addition, change or deletion of one or more software objects) to other versions of the project or to other projects, including other workspaces. CM applications often are configurable to provide such propagation. In CM applications having hierarchies of project versions and workspaces, propagation may comprise promotion of software components, in which software components are moved up in a hierarchy from a child version to a parent version, and/or updating of software components, in which software components are moved down in a hierarchy from a parent version to a child version.

In addition to providing the propagation of modified software components, some CM applications provide an issue tracking system that enables a user to record that an issue resolution has been propagated to one or more versions of the project or to other projects. For example, the user can make an entry in the tracking system that indicates that a particular issue resolution has been propagated to a particular version of the project. To determine that an issue resolution has been propagated to a version of the project, the user determines the software components and versions associated with the issue resolution, for example, by looking up the issue resolution in the issue tracking system. Then the user determines whether all of the versions of the software components have been propagated to the version of the project, for example, by looking up the list of software components and their associated versions currently in the project.

Related to issue tracking systems for software projects are workflow applications monitoring a workflow for one or more software projects. A workflow for a software project may be used to indicate or define a lifecycle for the software project, and may comprise a series of stages, related to one another by transitions, through which a software project may progress. In many conventional implementations, developers of software projects manage workflows using a workflow application separate from any CM application and issue tracking system implemented by the developers. A workflow application may maintain (or be used to maintain) a record of a workflow implemented for a software development effort or software project, and may maintain records of the status of software projects or portions of software projects (e.g., individual issues) in the workflow. From these records, users (including managers of software development efforts) may be able to determine quickly the overall status of one or more software projects (e.g., the user may determine that a software project is completed if all the issues in the software project are completed). Such information facilitates predicting, among other things, software project timelines (e.g., when a software project will reach the "Closed"—i.e., finished—stage).

Workflow applications and CM applications typically require that developers update the records maintained in both systems as a software project progresses through a lifecycle. For example, if a developer of a software project finishes his work on one or more software components and propagates his changes to the software components to another version of the software project (for example, from the workspace of the developer to the workspace of a tester), the developer is required to update the CM application's records (i.e., the issue tracking system's records) indicating that the changes have been propagated (i.e., indicate that an issue has been propagated) and the workflow application's records indicating the project's changed status in the workflow (e.g., the issue has moved from the "In Development" stage to the "In Test" stage).

As mentioned above, some CM applications configured to support propagation of software projects may be further configured to update the records of the issue tracking system when a software project is propagated, so the developer may not be required to update separately the CM application's records. In conventional implementations, however, the developer is still required to update the workflow application's records. Some developers have attempted to automate this process by implementing third-party software to integrate a CM application and a workflow application. Such third-party software may, for example, be implemented as a script or a trigger, and may monitor a CM application's records (e.g., records for an issue tracking system) for changes to one or more software projects. When a software project's CM records are updated, the third-party software may take a predetermined action based on the update, such as updating the workflow applications' records for the software project.

Such conventional systems are unreliable and prone to error, such as system error and/or human error. Human error is introduced when one relies on developers to maintain consistency of records. The developers may forget to update records of one or both applications (i.e., the CM application and the workflow application), refuse to update records, or incorrectly update records. System error arises when third-party software is used, as this approach often relies on software that has been put together with little understanding of the systems being interrelated. At best, third-party software methods rely on consistent and accurate monitoring of one system (e.g., the CM application) and the belief that the third-party software has predicted all possible changes that may be made to the one system and may therefore adequately propagate all changes to the other system (e.g., the workflow application). Relying on this belief is at best far from ideal and at worst mistaken.

Accordingly, there is need for a system which provides CM management functionality and workflow application functionality and which keeps the two types of data in sync while a software development effort is in progress, without reliance on a human agent to synchronize information and without needing external systems.

SUMMARY OF INVENTION

Embodiments of the invention are directed to a configuration management (CM) system, method, and product adapted to carry out workflow management tasks, which integrates status of software projects and issues, such that software projects may be more easily and reliably tracked and management of software projects may be streamlined. In some embodiments of the invention, a CM system is adapted to maintain records of software projects and/or issues managed by the CM system, the records comprising an indicator of a workflow progress stage for the project/issue. The CM system may be further adapted to update concurrently and automatically, according to an input from a user, both (1) a workflow progress stage value for the project/issue and (2) a record for software code associated with a project/issue, the record for the software code indicating a version and the project/issue in which the version is included.

In one embodiment, there is provided a method for associating a workflow transition and a version of a software project. The method comprises at least one computer-implemented act. The method comprises accepting a first indication of a workflow transition, said workflow transition to have a version of software components as a source, and accepting a second indication of a version of a software project. The method further comprises identifying the version as the source for software components being promoted when the workflow transition is applied and identifying the workflow transition as an action to be taken when a software component is promoted from the version. The method additionally comprises storing in a data structure in at least one computer-readable medium information regarding a relationship of the version and the workflow transition, the information at least in part identifying the version as the source.

In another embodiment, there is provided a computer-implemented method for promoting an issue in a software project. The method comprises identifying at least one software component associated with the issue in a version of the software project, and associating in a data structure the at least one software component with another version of the software project. The method further comprises retrieving from a computer-readable medium first information regarding a workflow for the software project—the workflow comprising a plurality of workflow stages and at least one workflow transition—and second information regarding an association between at least one transition of the at least one workflow transition and at least one version of the software project. The method additionally comprises determining whether the version is one of the at least one versions of the software project indicated by the second information, and, if it is determined that the version is one of the at least one versions, transitioning the issue in the workflow.

In a further embodiment there is provided a computer-implemented method for applying a workflow transition to an issue in a workflow for a software project. The workflow comprises a plurality of workflow stages and at least one workflow transition. The method comprises retrieving from at least one computer-readable medium first information regarding at least one action to be taken when the workflow transition is applied, and performing the at least one action specified by the first information. The method further comprises retrieving from the at least one computer-readable medium second information regarding an association between at least one transition of the at least one workflow transition and at least one version of the software project, and determining whether the workflow transition is one of the at least one transitions indicated by the second information. The method additionally comprises, if it is determined that the workflow transition is one of the at least one workflow transitions in the second information, identifying at least one software component of the issue and promoting the at least one software component.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3 is a table showing an exemplary structure in which issues may be stored in accordance with one embodiment of the invention;

FIGS. 4A, 4B, 4C, and 4D show exemplary types of information organized in exemplary structures which may be implemented by embodiments of the invention;

FIG. 16 is an exemplary data structure which may be implemented by embodiments of the invention to relate transitions to streams;

FIGS. 17A and 17B show exemplary issue records storing information before and after a workflow transition has been applied to the issue records.

FIGS. 17C and 17D show exemplary software component records storing information related to real and virtual versions of software components before and after a promotion operation has been applied to an issue related to the software component;

DETAILED DESCRIPTION

Figure 1:
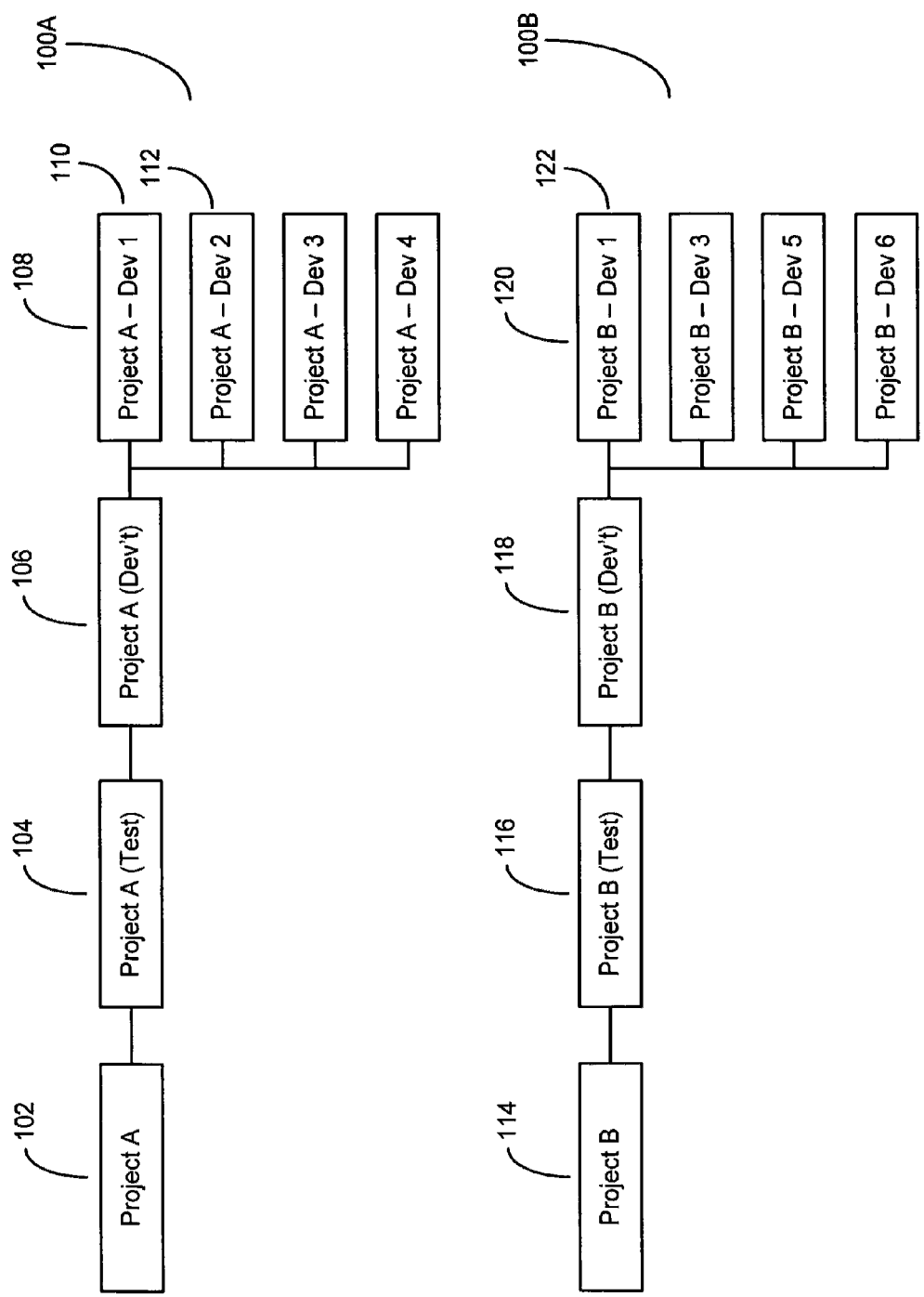
FIG. 1 shows an exemplary version hierarchy with which embodiments of the invention may act.

In the simplest software development effort, a single software developer may be working on a single issue (i.e., a single task) at a given time for a single software project. In a typical software development effort, however, in a software development organization of some size, multiple developers (i.e., coders or programmers) may be concurrently working on the same or different issues, and the issues may be associated with one or more software projects. Each software project of the one or more software projects may be associated with the same software product (i.e., software program or application) or different software products. As the number of variables—including, for example, developers, issues, projects, and products—grows, the complexity of monitoring and managing a software development effort grows.

In some embodiments of the invention, a configuration management (CM) application is also adapted to perform workflow management tasks. CM applications of embodiments of the present invention therefore integrate status of software projects with status of constituent issues, such that software development efforts may be tracked more accurately (i.e., with fewer discrepancies) and more easily and efficiently, and management of software projects may be facilitated and streamlined. In some embodiments of the application, a CM application may be adapted to determine a status of an issue in a workflow or in a software project based on one or more properties of the issue. Further, some embodiments of the invention may implement a CM application which maintains a data store describing a relationship between a workflow and a hierarchy of versions of a software project, such that as the issue is transitioned in the workflow, the issue may be propagated along the stages in the software project and vice versa (i.e., as the issue is promoted in the software project, the issue may be transitioned in the workflow).

More specifically, in accordance with various embodiments of the invention, in one aspect a workflow transition (described in greater detail below) may be associated with a version of a software project associated with a workflow. In addition to records regarding status of issues in workflows and in software projects, and various other records and data stores, a CM application as described herein may maintain a record of relationships between one or more workflow transitions and one or more versions of software components in a software project. Any suitable technique or techniques may be used to implement this relationship, with some embodiments of the invention accepting indications of a workflow transition and a version in a software project, and storing in the record of relationships an indication that the version is a source version for the issue, such that when the workflow transition is applied to an issue, the software components of the issue are promoted one level in a version hierarchy for the software project (illustrative implementations of software projects, versions, and hierarchies will be discussed in greater detail below).

In some exemplary implementations of CM applications produced in accordance with embodiments of the invention, once a workflow transition has been associated with a version of a software project, the CM application may be adapted to promote an issue in the software project when the workflow transition is applied and/or to transition an issue in the workflow when the issue is promoted in a software project. For example, when a user indicates that an issue should be promoted from one version of a software project to another version of the software project (e.g., from an in-development version to a testing version), such a CM application may first identify software components associated with the issue and associate those software components with the other version of the software project (i.e., the destination of the promote operation). The CM application may further retrieve from a data store information describing an association between workflow transitions for the software project and versions of the software project, and examine the information to determine whether the source version for the promote operation is a version indicated by the information. If the version is so indicated, then the workflow transition described in the information as being associated with that version may be applied to the subject issue, in the workflow. Some embodiments of the invention may implement CM applications which additionally or alternatively implement techniques for promoting an issue in a software project when the issue is transitioned in a workflow. Any suitable technique may be implemented, such as retrieving from at least one computer-readable medium first information regarding an action to be taken when the workflow transition is applied to the issue (e.g., prompting for a developer to which the issue should be assigned) and second information regarding an association between workflow transitions for the software project and versions of the software project. The CM application may take the actions prescribed for the issue by the first information, then determine from the second information whether the workflow transition applied to the issue is a workflow transition associated with a version in the software project. If the workflow transition is thus associated, then the issue may be promoted to another version of the software project, one level in a version hierarchy above the version indicated by the second information as associated with the workflow transition.

It should be appreciated that embodiments of the invention may not implement these exemplary processes for associating workflow transitions to versions of software projects, but may instead implement any other suitable technique for associating workflow transitions to software projects.

Embodiments of the invention may be implemented with CM applications and may further implement workflow functions carried out by CM applications in any suitable manner. Though exemplary implementations of CM applications employing aspects of the invention are described below, it should be appreciated that these implementations are merely illustrative and that embodiments of the invention may operate in any suitable manner implementing any suitable techniques and processes, and need not implement all aspects of the invention.

To facilitate discussion of methods and apparatuses according to the present invention, an overview of exemplary configurations for software projects and workflows are first provided.

FIG. 1 shows an exemplary logical format for a software development effort with which embodiments of the invention may be employed. FIG. 1 shows exemplary version hierarchies 100A and 100B for two software projects, Project A and Project B, respectively. The software projects may be associated with different software products or with different releases of the same software product (e.g., a "Version 1.0" and a "Version 2.0" of a software application or a "Version 1.0" and a "Version 1.1" tailored to a specific customer, environment, platform, etc.), or may be related to software products in any other suitable manner. Each software project may comprise one or more software components, and each software component may have one or more versions associated with one or more stages of progress—such as a development phase, a testing phase, a final release stage, workspaces (defined below) of developers (such as Developer 1 (Dev 1), Dev 2, etc.), or any other suitable stage of progress—such that different versions of a software component may be associated with different stages of development.

The software components of projects may be implemented and stored in any suitable manner. In some embodiments, a version of a software project—each stage of its progress or workspace—may be implemented as a "stream." As used herein, a "version" of a software development project (or other software entity) is a set of software components of the project, and for each software component, a version thereof. A version may be identified in any suitable manner, such as by a unique name or other suitable identifier, with the identifier being, for example, alphabetical, numerical, alpha-numerical, etc.

CM applications may implement versions in any suitable manner, including as streams. A "stream" is a data structure containing information describing a version of a software project (or other type of software entity) and a set of software components (i.e., one or more software components) associated with the version. A stream may relate a set of software components to one another and to metadata describing the version of the software development project and/or the software components. The metadata of a stream may be any suitable information about the software components and/or project, such as a status of the software components and/or a status of the project. It should be appreciated that different versions of a software project (or other type of software entity) may have the same content (e.g., may include a same set of software component versions) or different content. A developer's workspace may be considered a version of the project. One CM application which implements versions as streams is AccuRev 4.5 from AccuRev, Inc., of Lexington, Mass. Exemplary implementations of streams are discussed below, as well in co-pending U.S. patent application Ser. Nos. 10/894,697 and 10/894,964, both by Damon B. Poole and both of which are incorporated herein by reference in their entireties.

It should be appreciated, however, that some embodiments of the invention may implement versions using techniques other than streams. For example, some embodiments of the invention may operate using the well-known techniques and data structures of the Revision Control System (RCS), the Project Revision Control System (PRCS), or the Source Code Control System (SCCS). Embodiments of the invention may be implemented on systems using any suitable techniques or data structures for storing versions of files and data about the files, as embodiments of the invention are not limited in this respect.

Versions of software projects may be associated in a version hierarchy. Thus, when versions are implemented as streams, a stream may be part of a stream hierarchy. A "stream hierarchy" (and, by abstraction, a version hierarchy) is a logical hierarchy of streams defining relationships between streams. For clarity, one exemplary implementation of versions and software project structure will be discussed below, wherein versions are implemented as streams, but it should be appreciated that embodiments of the invention may implement versions in any suitable manner (for example, using any of the illustrative techniques discussed above).

As shown in FIG. 1 (discussed in greater detail below), a stream hierarchy includes at least one stream, the "source stream," which is at the highest level of the hierarchy (102 and 114, respectively), and is the stream from which the other streams of the hierarchy are ultimately derived. Thus, the source stream is said to be the "parent" of all other streams, and the other streams directly derived from it are (at least initially) its "children." In general, a stream having one or more children is a "parent stream" or "parent" of each of its child streams. A parent stream, including the source stream, may have one or more "children" or "child streams," each of which inherits one or more properties of the parent stream and its ancestors. For example, each child stream includes at least a subset of the directory elements (discussed below) included in its parent stream. A child stream may be derived directly (i.e., created from) its parent stream, though this is not always the case, as a stream's relative position within the hierarchy may change over time. As a result, a child stream may, at some time, have a parent from which the child was not originally derived.

Embodiments of the invention may implement one or more types of streams. For example, one type of stream is the one discussed above, which may describe a version of a software project and a set of software components associated with the version. Other types of streams may have additional functionality. For example, a "project stream" may be a stream in which the stream data structure (i.e., the base structure of the stream as discussed above) has an additional element which describes that the project stream is a source stream for a software project.

As another example, a workspace may be implemented as a stream having an additional element in the data structure indicating that changes may be made to the software components associated with the workspace. Accordingly, as used herein, a "workspace" is a type of stream in which a developer can make changes to the content of a software project (e.g., the software components of the software project). Workspaces, in some embodiments of the invention, may be limited to being at the bottom of a stream hierarchy and any stream ancestry chains determined for the stream hierarchy. In some embodiments, workspaces are further configured such that they cannot have child streams; i.e., so that they cannot be a parent stream. Thus, in some embodiments, changes to a software project are made only in workspaces and then propagated to other streams according to techniques discussed in greater detail below.

As discussed briefly above, FIG. 1 shows two exemplary stream hierarchies, one for Project A 100A and one for Project B 100B, each comprised of a plurality of streams. Stream 102 (marked Project A) and Stream 116 (marked Project B) may be considered the source stream for each of the stream hierarchies 100A and 100B, with each having a number of child streams. Some of the child streams, such as child streams 110 and 112, are represented as workspaces for developers (e.g., Workspace—Developer 1 (Dev 1) 110, Workspace—Developer 2 (Dev 2) 112, etc.). A developer may have a single workspace where all changes are made, or the developer may have multiple workspaces (e.g., 110 and 122 are both associated with Dev. 1) depending on which software project he or she is working. Each stream hierarchy, in addition to the workspaces, has development streams 106, 118 which developers may use to propagate work done in their workspaces (e.g., changes made to one or more software components). Changes may be propagated up a hierarchy or propagated down in a hierarchy. As used herein, "promote" means to propagate up a hierarchy, whereas "update" means to propagate down through a hierarchy.

The stream hierarchies also have testing streams 104, 116 which may hold streams for the projects that are used by test engineers such as Quality Assurance (QA) engineers to test the work done by the developers. In the stream hierarchy, software components may be propagated up the stream (i.e., "promoted") or may be propagated down the stream (i.e., "updated"). For example, a software component edited by Developer 1 may be promoted from workspace 106 of Developer 1 to the development stream 104 for Project A, and the versions of the software component of the other child streams of the development stream 104 (i.e., workspaces of Developers 2, 3, 4) may be updated.

It should be appreciated that the structures of software projects of FIG. 1 (e.g., the stream hierarchies) are merely exemplary, and that embodiments of the invention are not limited to implementing the illustrative hierarchies and structures shown in FIG. 1. Embodiments of the invention may implement any suitable structure for software projects and versions of software projects.

Figure 2:
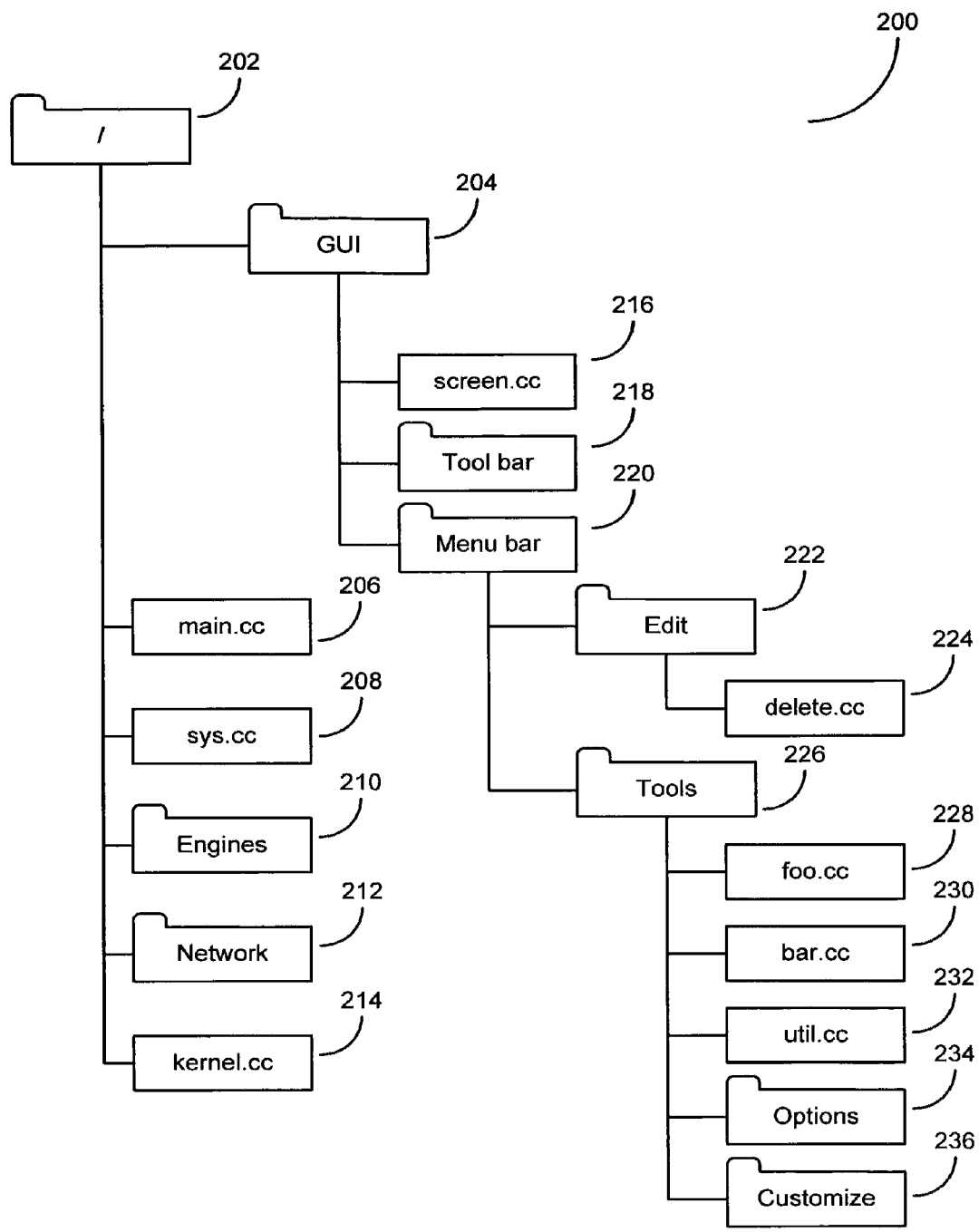
FIG. 2 is a diagram illustrating an exemplary of an element hierarchy for use herein.

A version of a software project (e.g., a stream), as mentioned above, is a set of software components that may be related to the software project. As used herein, "software components" include any element of a software project. Software components may be, for example, a program, a file, a directory, a directory element, an object, a record, a table, another type of software component, and any combination thereof. As used herein, a "directly element" is a directory or a file. Additionally, elements of software projects, such as a files, may be organized in a hierarchy. A "file hierarchy" is a logical hierarchy defining an organization of files. FIG. 2 illustrates an example of an element hierarchy. A file hierarchy includes at least a root directory 202 at a highest level of the hierarchy. The root directory may include, at a second level in the hierarchy, one or more directory elements. As used herein, a "directory element" is an element of a directory, and may be any of a variety of types of software components. For example, a file such as file 206 ("main.cc") or a sub-directory such as sub-directory 204 ("GUI") may be directory elements. As used herein a "directory," including the root directory and any of its sub-directories, is a directory element (e.g., of a file hierarchy) that includes one or more other directory elements (e.g., files and/or directories).

As used herein, a "child element" or "child" of a directory is an element included within the directory at a level immediately below the level of the directory in the hierarchy, whereas any element included within the directory, regardless of level, is referred to as a "descendant element" or a "descendant" of the directory. For example, directory 204 is a child element of root directory 202, while directory 220 is a descendant element of root directory 202. Conversely, a directory is referred to herein as a "parent directory" or "parent" of any elements included in the directory at the level immediately below the directory, and is referred to as an "ancestor element" or "ancestor" of any included element, regardless of hierarchy level. Conceptually, a file hierarchy is not limited to a maximum number of levels, although in practice, this number may be limited by computation and storage capabilities of the system on which the file hierarchy is implemented.

In some embodiments of the invention, each software component of a software project is assigned a unique identifier for the software component. The identifier preferably is "unique" in that it is assigned to the component on the component's creation and it stays with the component regardless of which version or versions the software component is a part or changes to the component made by a developer. The unique identifier, which in some embodiments of the invention may be termed an element identifier (EID), may be any of a variety of types of identifiers, such as numerical, alphabetical, alphanumerical, etc. If the component represented by an EID is a file or directory, providing a numerical value may avoid problems commonly encountered in known systems where an alphabetic identifier is used. For example, files and directories are frequently renamed, such that a current name of a file or directory may not be a same name that the file or directory had in the past. Further, the current name may be a name formerly used by another file or directory. The ability of a file or directory name to change over time, and the absence of another unique identifier that remains constant, may create confusion and cause problems when an attempt is made to determine a status of a file or directory at a past time. For example, in some CM applications, if an attempt is made to determine the status of a file in the past (e.g., by resorting to tape backup), and the file had a different name and another file had the file's current name, the wrong file may be identified and an incorrect status determined. This problem may be eliminated by providing a unique numerical identifier for a file or a directory that remains constant throughout the life of a file or directory, regardless of whether the file's or directory's name is changed.

In addition to an EID, in some embodiments of the invention, a software component may be associated with one or more other values indicating one or more versions of the software component. For example, a software component may be associated with one or more stream IDs, one or more instance IDs, one or more real stream IDs, one or more edition IDs, a transaction ID, and/or any other suitable identifier. These other identifiers may be used in embodiments of the invention to identify "virtual versions" and "real versions" of the software component which are included in versions of the software project, though alternative embodiments of the invention may not track real and virtual versions of software components and thus may not store these identifiers, or may store more or fewer identifiers to track version information in any other suitable manner.

A "virtual version" may be an instance of the software component. The virtual version may have the same content as, or different content than, other virtual versions of the software component, including the software component from which it was created. Thus, although it is common in the field of software configuration management to refer to different instances of a software component (e.g., components in different versions of a software project) as different "versions" of the component (even if the content of each "version" is in fact the same), such instances are referred to herein at "virtual versions."

Alternatively, a "real version" is an edition of a software component having different content than the previous real version of a software component from which the edition was created. Thus, if a change is made to a software component and recorded (as part of a project), a new real version of the software component may be created.

For example, referring to the version hierarchy shown in FIG. 1 and element hierarchy shown in FIG. 2, if file 206 were created in workspace 110 and promoted to version 106, the virtual version (i.e., instance) of file 206 in each stream would be different, although the real version (i.e., edition) of the file would be the same. If file 206 were then edited in workspace 112, workspace 112 would have a different real version of file 206 than workspace 110.

As used herein, a "version" of a software component (e.g., a file) or a "software component version" means the real version of the software component, not the virtual version of the software component. Thus, in determining a software component version included in an issue resolution or a stream, the real version of the software component is determined. As discussed above, in some embodiments of the invention, modifications to a software component (e.g., add, remove, change) are made in workspaces only. In such embodiments, each version (i.e., real version) of a software component may correspond to the workspace in which it was created.

A stream ID stored in association with a software component may, therefore, be used to represent the stream ID of the stream of a virtual version of the software component. An instance ID of the software component may be used to identify a an instance of the virtual version of the software component. A stream ID and an instance ID may, then, be used to specify a stream/instance pair defining a virtual version of a software component. Likewise, a real stream ID and an edition ID of a software component may define a real version of a software component.

Table I shows an exemplary record for real and virtual versions of a software project. It should be appreciated that this record is merely illustrative, and embodiments of the invention may store version information for software components in any suitable manner. For a given software component (e.g., file 206 of FIG. 2) with an EID of 2, a record for the software component stored by a CM application may be:

TABLE I

| EID | Stream ID | Instance ID | Real Stream ID | Edition ID | Transaction # |
|---|---|---|---|---|---|
| 2 | 4 | 1 | 4 | 1 | 6 |
| 2 | 3 | 1 | 4 | 1 | 7 |

TABLE I-continued

| EID | Stream ID | Instance ID | Real Stream ID | Edition ID | Transaction # |
|---|---|---|---|---|---|
| 2 | 2 | 1 | 4 | 1 | 8 |
| 2 | 5 | 1 | 5 | 1 | 9 |
| 2 | 4 | 2 | 4 | 2 | 10 |
| 2 | 4 | 3 | 4 | 3 | 11 |
| 2 | 5 | 2 | 4 | 3 | 12 |
| 2 | 5 | 3 | 5 | 3 | 13 |

For the purposes of the exemplary record shown in Table I, and for further examples discussed below, Table II shows stream IDs for the streams shown in the exemplary version hierarchy of FIG. 1.

TABLE II

| Stream ID | FIG. 1 Identifier | FIG. 1 Name |
|---|---|---|
| 1 | 102 | Project A |
| 2 | 104 | Project A (Test) |
| 3 | 106 | Project A (Dev't) |
| 4 | 110 | Workspace — Dev. 1 |
| 5 | 112 | Workspace — Dev. 2 |

Each entry of Table I may specify a virtual version of a software component, the corresponding real version of the software component, and the transaction number of the transaction that created the virtual version of the software component. As shown in Table I, a software component with an EID of 2 (e.g., file 206 of FIG. 2), has five "real versions" created by developers: a first edition of file 206 created in stream 4, a second edition created in stream 4, a third edition created in stream 4, a first edition created in stream 5, and a third edition created in stream 5. As discussed above, a real version is defined by a real stream ID/edition ID pair. Table I also shows that file 206 is included in four different streams of the software project, streams 2, 3, 4, and 5, because each of those four streams includes a virtual version of the file, or a reference to a real version of the file. The virtual version of stream 1, for example, is a reference to the real version 4/1, the first edition of the file created in stream 4. Likewise, the virtual version 3/1 (the first instance of stream 3) is a reference to real version 4/1. As may be also seen from Table I, stream 5 initially created a new version of file 206 in real version 5/1, later included a virtual version 5/2 referencing the real version 4/3 of the file, and then later made its own edits to the file and created real version 5/3.

Table I, in addition to including fields regarding real and virtual versions of a software component, also includes a field for a transaction ID number for a transaction that created the real or virtual version. In some embodiments of the invention, a CM application may associate each action taken by a user and/or automated action taken by the CM application itself with a transaction number, such that actions may be tracked and a user may be able to determine a sequential ordering of steps taken by the user, other users of the CM application, and/or the CM application. A transaction ID may be a sequential number, a time at which the action was taken, or any other suitable identifier. Associating actions with transaction IDs may be advantageous in a number of ways, such as aiding users in determining when errors were inserted into a software project, for example, and aiding users in "rolling back" changes that created errors. It should be appreciate that embodiments of the invention are not limited to implementing CM applications tracking actions taken by users or the CM applications, and that CM applications implemented in accordance with embodiments of the invention may store any suitable information.

TABLE III

| EID | Parent Stream | Parent Edition | Child Stream | Child Edition |
|---|---|---|---|---|
| 2 | 4 | 1 | 5 | 1 |
| 2 | 4 | 1 | 4 | 2 |
| 2 | 4 | 2 | 4 | 3 |
| 2 | 4 | 3 | 5 | 3 |

Table III shows another exemplary data structure which may be implemented by some embodiments of the invention to track version ancestry for a file. Table III shows a record of parent/child relationships between real versions of a software component. As used herein, a "parent" version of a particular version of a software component is the version from which the particular version was created. Conversely, a "child" version of a particular version of a software component is a version created from the particular version. A new entry may be added to a record such as the one shown in Table III each time a transaction results in the creation of a new real version of a software component.

For each entry in Table III, an EID field may hold a value representing a unique identifier (e.g., a number) of a software component. The combination of values of the Parent Stream and Parent Edition fields may specify a unique stream/edition pair defining a real version of the software component specified by the EID field. This real version is the parent of the real version specified by the unique stream/edition pair specified by the Child Stream and Child Edition fields.

In some embodiments of the invention, a data store of software components may store different real versions of a software component as a series of "deltas" or differences from a previous version. For example, the first version of a file may be stored in full, while a second version of the file may be stored only as one or more references to deletions and/or additions that were made to the file between versions. When a version of a file is needed (for example, at build time for a software project or when a developer wants to view and/or edit the file), then the original file may be retrieved and any necessary additions and/or deletions made by versions between the original version and the version on which work is being done applied. In this manner, CM application implemented in accordance with these embodiments of the invention may conserve disk space by not storing full copies of files.

CM applications may additionally or alternatively store records for determining software components included in streams at particular times. Table IV shows exemplary data and fields that may be included in such records.

TABLE IV

| Stream ID | EID | Transaction # | In-progress? |
|---|---|---|---|
| 4 | 2 | 6 | 1 |
| 4 | 2 | 7 | 0 |
| 2 | 2 | 7 | 1 |
| 2 | 2 | 8 | 0 |
| 1 | 2 | 8 | 1 |
| 5 | 2 | 9 | 1 |
| 4 | 2 | 10 | 1 |
| 4 | 2 | 11 | 1 |
| 5 | 2 | 12 | 1 |
| 5 | 2 | 13 | 1 |

In Table IV, the stream ID field may hold a value specifying an ID of the stream to which the entry in the record applies. EID field may hold the EID of the software component represented by the entry. The transaction number field, as mentioned above, may hold a value representing a transaction number or other value corresponding to a time at which the entry was made. The in-progress field may hold a value indicating whether the software component is in progress for the stream at the time corresponding to the value of the transaction field. As described above, a software component of a stream is "in progress" if a modification has been made to the software component (i.e., it has been added, modified, or removed) and the stream has not been promoted to a parent stream (i.e., propagated up in a version hierarchy). If a software component is in progress within a stream, then the version of the software component in the stream and its children may be different than the version of the software component elsewhere within the stream hierarchy. For example, the software component may not even exist in other streams in the hierarchy. Alternatively the software component may have been removed from the subject stream and its children, but still may be present in other stream of the stream hierarchy.

Having now described the arrangement of exemplary records which may be maintained by embodiments of the invention regarding software components and streams, examples of transactions that may result in the entries in Tables I, III, and IV will now be described. References may be made to the version hierarchy of FIG. 1, the element hierarchy of FIG. 2, and the stream IDs shown in Table II.

In transaction six, file 206 may have been created in workspace 110, resulting in the creation of a new virtual version and a new real version of file 206. This transaction may have resulted in the first entries of Tables I and N (i.e., those having a Transaction ID of 6). As indicated in Table IV, because file 206 is yet to be promoted from workspace 110 to stream 106, the in-progress field for the entry indicates that file 206 is in progress in workspace 110. The entry in Table I for this transaction indicates that the virtual version (4/1) and the real version (4/1) resulting from transaction six are the same.

Transaction six does not result in the creation of an entry in Table III because file 206 is a new file for which version ancestry has not yet been established.

In transaction 7, file 206 may be promoted from stream 110 to stream 106. resulting in the creation of a new virtual version of file 206. Transaction seven may result in the second and third entries of Table IV and the second entry of Table I. As indicated by the entries in Table IV, file 206 is no longer "in progress" in workspace 110, but is in-progress in stream 106. The entry in Table I indicates that the virtual version (i.e., stream/instance pair) 3/1 corresponds to the real version (i.e., stream/edition pair) 4/1. Transaction seven does not result in the creation of an entry in Table III because transaction seven did not result in the creation of a new real version of the file 206, but merely the creation of a new virtual version.

In transaction eight, file 206 may be promoted from stream 106 to stream 104, resulting the creation of a new virtual version of file 206. Transaction eight may result in the fourth and fifth entries of Table IV and the third entry in Table I. Transaction eight does not result in the creation of an entry in Table III because a new real version of file 206 has not been created.

In transaction nine, file 206 may be modified in workspace 112 (in which file 206 was included because workspace 112 is a descendant stream of streams 104 and 106) and the modification recorded to create a new virtual version and new real version of file 206. Transaction nine may result in the sixth entry of Table IV, the fourth entry in Table I, and the first entry in Table III. The entry in Table III reflects that real version 5/1 was created from real version 4/1.

In transaction ten, file 206 may be modified in workspace 110 and the modification recorded to create a new virtual version and a new real version of file 206. Transaction ten may result in entry seven in Table IV, entry five in Table I, and entry two in Table III. The entry in Table III indicates that new real version 4/2 was created from real version 4/1.

In transaction eleven, file 206 may be modified in workspace 110 and the modification recorded to create a new virtual version and a new real version of file 206. Transaction eleven may result in the eighth entry in Table IV, the sixth entry in Table I, and the third entry in Table III.

In transaction twelve, file 206 may be sent from workspace 310 to workspace 112, thereby creating a new virtual version of file 206. In other words, rather than promoting a file from workspace 310 to stream 106 and stream 104, a user (e.g., a developer, project leader, etc.) may directly send (e.g., copy and paste) file 206 from workspace 110 to workspace 112, thereby replacing whatever version of file 206 currently resides in workspace 112. For example, a user interface (e.g., a GUI) may enable a user to specify file 206 (e.g., by typing in an identifier or selecting it from a user interface display), and send file 206 to workspace 112.

Transaction twelve may result in entry nine in Table IV and entry seven in Table I. The entry in Table I indicates that virtual version 5/2 of the file 206 created in workspace 112 corresponds to real version 4.3 of the software component in workspace 110. It should be appreciated that transaction twelve did not result in an entry in Table III because it did not result in the creation of a new real version.

In transaction thirteen, file 206 may be modified in workspace 112 and the modification recorded to create a new virtual version and a new real version of file 206. Transaction thirteen may result in the last entry in Tables I, III, and IV. The entry in Table III, as before, indicates that the new real version 5/3 of file 206 was created from real version 4/3 of file 206.

It should be appreciated that these exemplary transactions are merely illustrative of actions that may be supported by CM applications implemented in accordance of embodiments of the invention and that in some embodiments of the invention CM applications may not support some of these actions or may support actions not described above. Further, it should be appreciated that the data structures and records described above in conjunction with Tables I-IV are merely exemplary and that embodiments of the invention may maintain any suitable records implemented in any suitable data structures.

For example, in some embodiments of the invention, a CM application may additionally or alternatively store records of issues managed by the CM application. For examples, an issue record may be maintained that associates an issue with one or more files and/or one or more streams.

An issue is a software project or software sub-project with which changes to one or more software components may be associated. Issue records may maintain any number of fields storing any suitable type of information. An exemplary issue record is shown in FIG. 3.

FIG. 3 shows an issue record comprising a field for an issue identifier, an issue name, an issue description, a developer to which the issue is assigned, and a target release for the issue. The issue identifier may be any suitable unique identifier for an issue, such as a sequential numerical value or any other unique value. The issue name and description may be any suitable alphanumeric description of the goal of the issue. Some issues may be associated with feature expansions of a software project (e.g., adding new functionality to a software product) while other issues may be associated with correction of an error or bug in a software project. The issue name and description fields would describe the purpose of the issue to a user of a CM application such that the CM application may identify an issue. The "assigned to" field is used to designate a user of the CM application (e.g., a developer) as a user responsible for the issue. For example, if an issue is associated with correcting an error, the developer assigned to identify and correct the error is the user to which the issue is assigned. The target release of the issue is an indicator of which software project the issue is a part (e.g., with which software product the issue is associated, or with which version of a software product the issue is associated). Issue records in alternative embodiments of the invention may store more or less information than is shown stored in the exemplary record of FIG. 3 in any suitable field or fields, as embodiments of the invention are not limited in this manner.

As mentioned above, issues may be associated with streams and/or software components. In some embodiments of the invention, a developer may make changes to one or more files in his or her workspace (e.g., workspace 110) and, upon having committed the modifications to the database to create new real versions of the software components, may indicate to the CM application that the changes made were made as a part of resolving a particular issue. An issue may therefore become associated with one or more versions of software components. Once the association between a software component and an issue has been made, a stream may be considered to include the issue if the stream includes a virtual version of the software component referring to the real version of the software component associated with the issue, or if the stream includes a real or virtual version of the software component which is a child or descendent of the version associated with the issue. Herein, a stream will be said to "include an issue" or "include an issue resolution" if the stream incorporates the versions of software components indicated by the issue record.

In some embodiments of the invention, a CM application may maintain a record of versions of software components associated with an issue. Table V shows an exemplary format for a data structure representing a history of changes made to an issue with regard to software components.

TABLE V

| Issue # | EID | Transaction # | Stream ID | Edition ID | Member? |
|---|---|---|---|---|---|
| 1 | 2 | 20 | 5 | 1 | 1 |
| 1 | 3 | 20 | 5 | 1 | 1 |
| 1 | 2 | 21 | 5 | 3 | 1 |
| 1 | 3 | 22 | 5 | 1 | 0 |

The record of Table V may be used to determine software component versions (i.e., real versions) included in an issue resolution at a particular time. Table V includes a number of entries, where each entry includes an issue number identifying the issue to which the entry relates, an EID for a software component, a transaction number identifying an action which created the entry (e.g., the action which related the software component to the issue), a stream/edition ID pair identifying a version of the software component identified by the EID, and a member field. The member field may hold a value representing whether the software component version represented by the entry is currently a member of the issue resolution represented by the entry. For example, an entry may have resulted from a software component version being added to (i.e., associated with) an issue resolution, in which case the member field may indicate that the software component version is a member at the time represented by the transaction number. Further, the entry may have resulted from the software component version being removed from (i.e., disassociated from) the issue resolution, in which case the member field may indicate that the software component version is not a member of the issue resolution at the time represented by the transaction number. The value held in the member field may be any of a variety of types, for example, a Boolean value where "1" means that the software component version is a member at the time corresponding to the entry and a "0" means that the software component version is not a member of the issues resolution at the time corresponding to the entry.

FIGS. 4A-4D diagram a relationship between streams, issues, and software components that may be implemented by embodiments of the invention. It should be appreciated that embodiments of the invention are not limited to implementing the relationship displayed in FIGS. 4A-4D, and that embodiments of the invention may relate streams, issues, and software components in any suitable manner.

FIG. 4A shows a simplified stream hierarchy 400, consisting of three streams: a source stream Project A, having a stream ID of 1; Project A (Test), having a stream ID of 2; and Project A (Dev't), having a stream ID of 3. FIG. 4B shows an issue record 402 comprising two issues following the exemplary structure described above in conjunction with FIG. 3.

FIG. 4C shows a relationship between issues and software components in the form of a change package 404, in which entries in the record having a change package ID (CPK) that matches an issue number are considered to be associated with the issue. Each change package entry has an EID identifying a software component, and two indicators of versions of the software component. For example, as shown in change package 404, issue 1 is related to specified versions of software components 5, 6, and 7, while issue 3 is related to a specified version of software component 1.

As described above, in some embodiments of the invention, changes made to a software component by a developer may be identified based on the additions and/or deletions made by the developer and stored with an indicator of the version of the software component with which the changes are associated and the version of the software component to which the changes were made. In the record of FIG. 4C, the version field of the change package identifies a version included in the change package—the version including the changes made by the developer while resolving the issue—while the basis field indicates the version of the software component to which the changes were made. For example, the change package for issue 1 indicates that a real version of a software component with an element ID (EID) of 5 which was a second edition of the component produced by stream 3 (Project A (Dev't)) is included in the software project, and the version of the software component to which the changes for version 3/2 were made is version 3/1 (e.g., version 3/1 formed the basis for the changes of version 3/2).

FIG. 4D shows a data store 406 storing information comprising records 408 of software components and versions. The records 408 comprise entries for software components and versions referred to by the change package 404 and incorporated in streams of the stream hierarchy 400. Records 408 indicate both virtual versions ("instances") and real versions ("editions") of software components related to an EID.

In embodiments of the invention, a CM application may maintain records, such as the exemplary records discussed above, indicating which versions of a software component are incorporated in streams. Additionally, a CM application may maintain records indicating versions of software components which are related to issues (e.g., change package 404). An issue may be related to a stream, then, if each of the versions of the software components referred to by the change package for the issue are included in the stream. To determine whether an issue resolution is included in a stream, a CM application may retrieve from a data store in any suitable memory or other computer-readable medium an indicator of which versions are included in the stream. The CM application may then retrieve from the same data store or a different data store an indicator of which versions of the software components are related to an issue. If each of the software components and each of the versions associated with the issue are incorporated in the stream, then the stream may be said to include the issue resolution. A similar process may be used to identify which issues are included in a stream, instead of whether or not a particular issue is included. For example, the versions of software components incorporated into a stream may be compared to each of the issue records and change packages maintained by the CM application, and a list of issues related to those versions output to a user.

It should be appreciated that the foregoing descriptions of data structures which may be implemented by embodiments of the invention for versions/streams, software components, versions, and relations between them are merely exemplary, and that embodiments of the invention may implement any suitable data structure storing any suitable data to implement versions of software projects and versions of software components, as the invention is not limited in this respect. For example, which FIGS. 4B and 4C show different records that may be maintained for descriptions of an issue and files/versions associated with the issue, in some embodiments of the invention a CM application may maintain both sets of this information in a single record. Additionally, in some embodiments of the invention changes made to files related to resolving issues may not be stored as a series of "deltas" or differences, but rather as whole versions of files. Further, embodiments of the invention may implement versions in a manner other than as streams, such as using the techniques and data structures of the Revision Control System (RCS) or any other suitable system.

Figure 5:
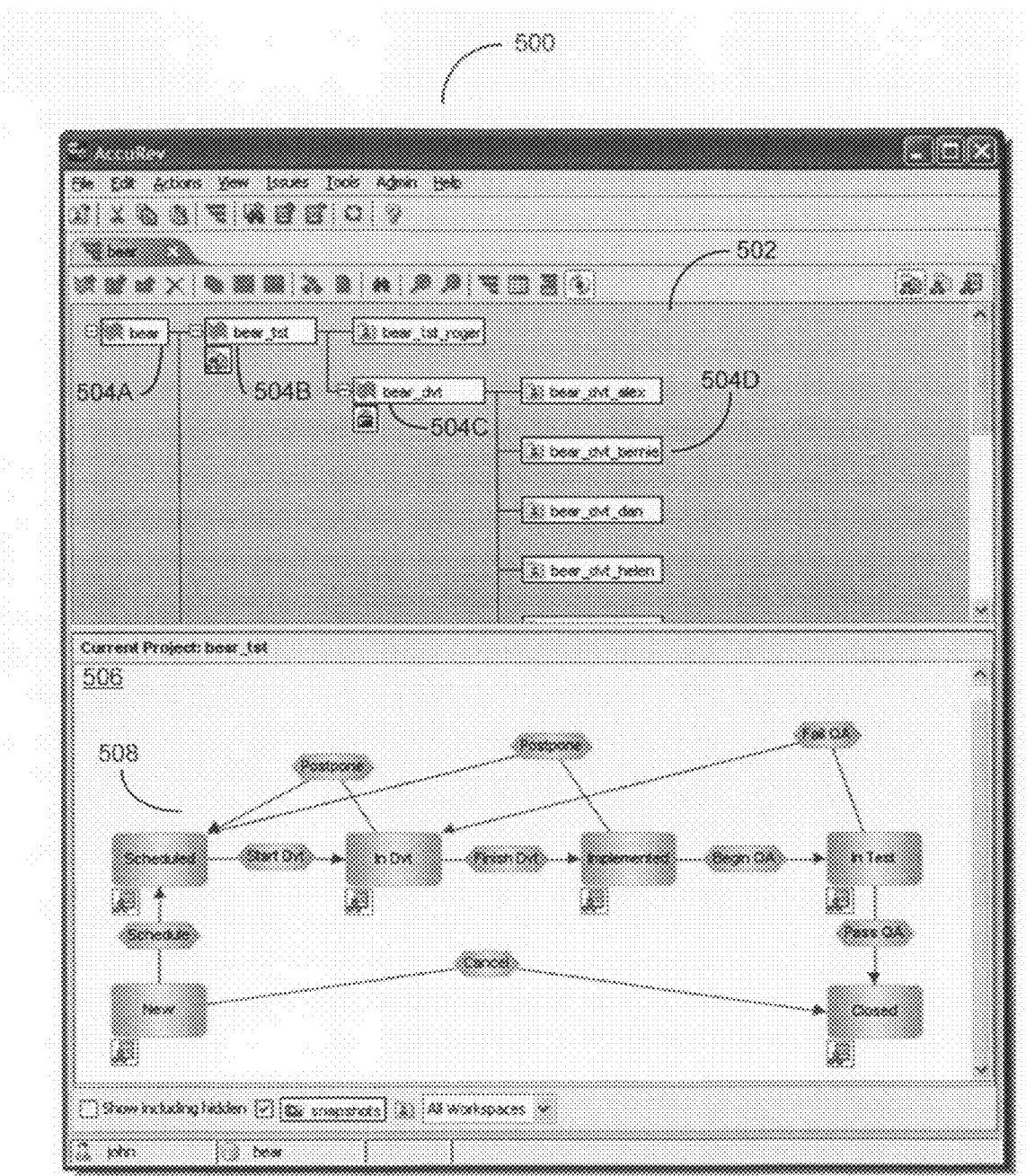
FIG. 5 is a screen shot illustrating an exemplary graphical user interface (GUI) that may be implemented by one embodiment of the invention, the GUI including a stream hierarchy and associated workflow, which may be implemented by embodiments of the invention.

As discussed above, in some embodiments of the invention, a CM application may be implemented which incorporates workflow functionality. FIG. 5 is a diagram of an exemplary graphical user interface (GUI) 500 of a CM application produced in accordance with embodiments of the invention. The GUI 500 includes two parts 502 and 506 showing a version hierarchy of a software project and a workflow for the software project, respectively. The version hierarchy shown in portion 502 of GUI 500 may be implemented as a stream hierarchy—and the versions therein as streams—or as any other suitable version hierarchy. The illustrated version hierarchy includes a source version 504A, several intermediate versions such as versions 504B and 504C, and workspaces 504D.

Figure 6:
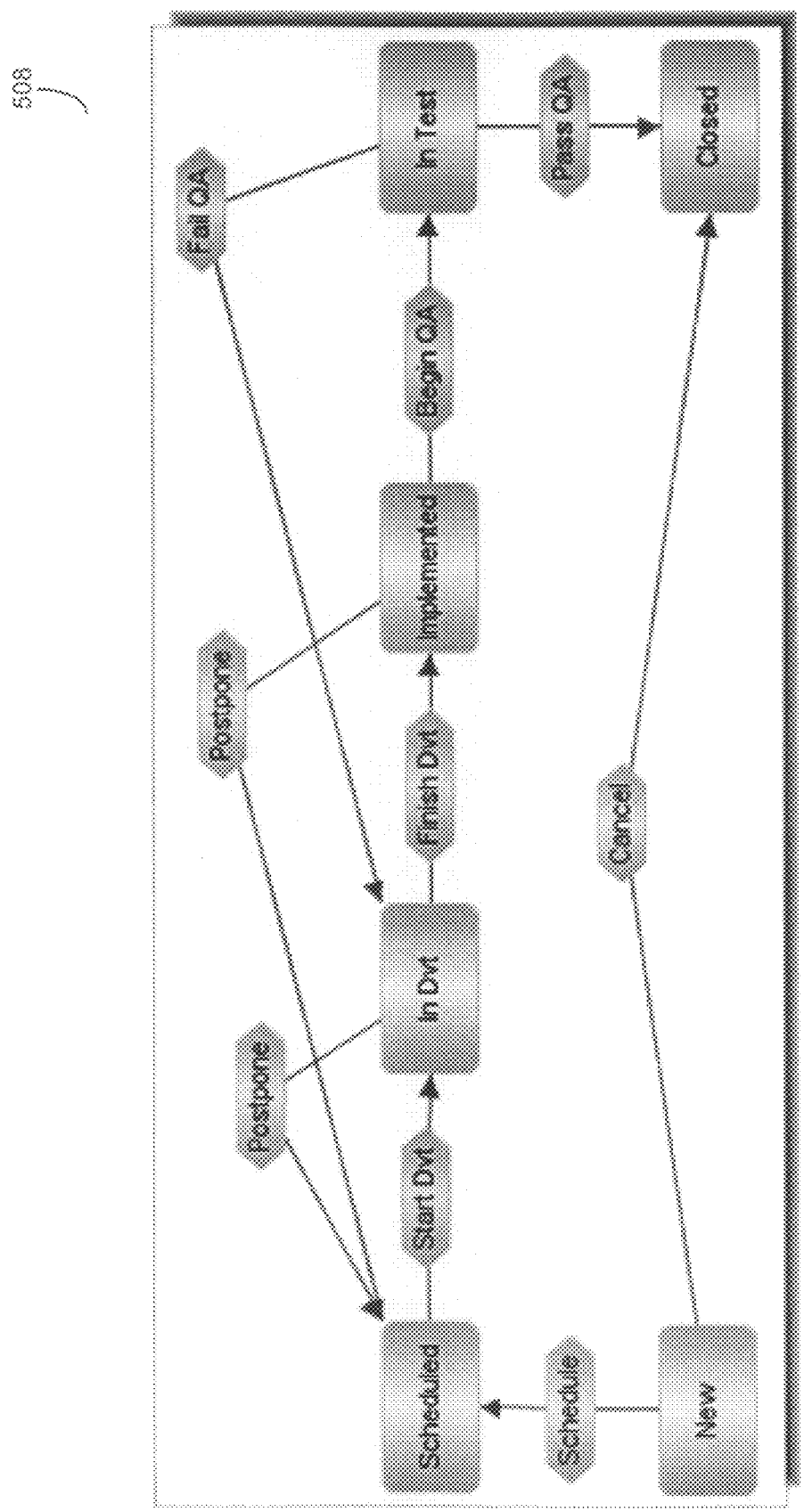
FIG. 6 is a diagram of an exemplary workflow showing exemplary workflow components that may be implemented in accordance with embodiments of the invention.

The portion 506 of the GUI 500 shows an illustrative workflow 508 which may be implemented by embodiments of the invention. FIG. 6 shows workflow 508 in a larger, more clearly visible format. In some embodiments of the invention, the workflow 508 may be standard for all software projects managed by the CM application or, in alternative embodiments of the invention, a custom workflow 508 may be developed for each software project managed by the CM application.

In some embodiments of the invention, a workflow, such as workflow 508, may include a multitude of workflow stages (e.g., New, Scheduled, In Development) and workflow transitions relating the stages describing actions that must be taken for a software project to move between stages (e.g., Schedule, Start Development, Postpone).

In some embodiments of the invention, a workflow may be implemented to describe a life cycle for issues and to monitor those issues as they progress through the life cycle, though it should be appreciated that a workflow may track development of any suitable piece of a software project (e.g., the software project itself, a software component of the software project, etc.). The exemplary workflow shown in FIGS. 5 and 6 is a workflow for an issue, and, for clarity, workflows will be discussed below with regard to issues, but it should be appreciated that a workflow may be implemented to track any suitable piece of a software project.

A "workflow stage" or a "stage" of any workflow is a progress waypoint for the workflow, a point at which, for example, an issue may be considered to have progressed an appreciable amount or reached a goal. For example, an object (e.g., an issue) entering a workflow may first be considered "new," but once the issue has achieved a certain status the object may be placed at another stage of the workflow. Typically, a workflow will have two or more workflow stages.

Figure 7:
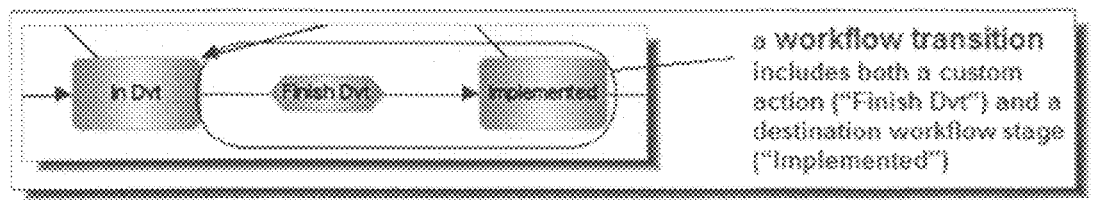
FIG. 7 is a diagram of an exemplary implementation of workflow components, in accordance with one embodiment of the present invention.
Figure 8:
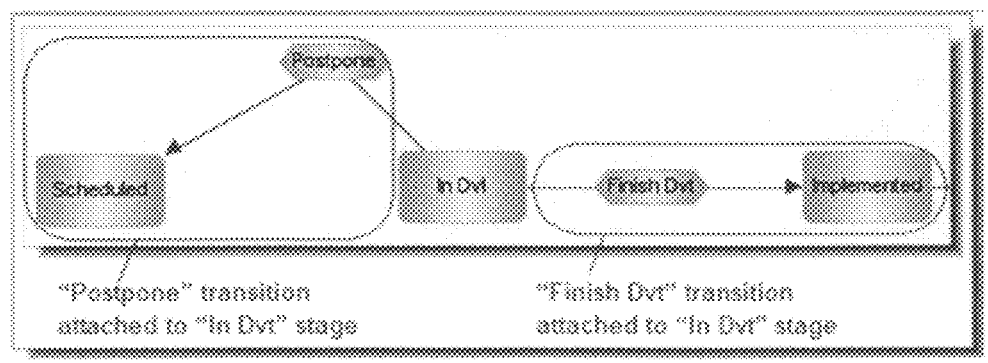
FIG. 8 is a diagram of another exemplary implementation of workflow components, in accordance with one embodiment of the present invention.

When an object (e.g., an issue) moves to another workflow stage of the workflow (or when the CM application receives an indication, for example, from a user, that the object should move), a "workflow transition" or "transition" may be applied to the object. As discussed further below, workflow transition may dictate one or more actions that should be taken in response to the change in status. For example, a CM application may prompt a user for one or more values to update properties of the object. As shown in FIGS. 7 and 8, while a workflow transition is typically unidirectional between two stages of a workflow, a stage may have multiple transitions to or from the stage. Typically, a workflow will have at least one transition, and each workflow stage may have at least one transition either pointing to or from the workflow stage.

In the exemplary workflow 508, software projects in the New stage may be transitioned to the Scheduled stage by scheduling the software project for implementation, or transitioned to the Closed stage by being canceled. As will be discussed in greater detail below, the transitions may be applied either automatically by a CM application or in response to a specific action taken by a user. For example, if an issue is assigned a target release and a developer, the issue may meet the requirements of the Scheduled stage and the CM application may automatically apply the Schedule transition and carry out any specified actions (discussed in greater detail below). Alternatively, a user may indicate to the CM application that an issue should be transitioned from New to Scheduled, and the CM application may take any specified action, such as prompting the user for values for the issue's "target release" and "assigned to" fields as well as take any other action described by the transition.

Workflow 508 shows other stages and transitions in the exemplary workflow. If a software project is in the Scheduled stage, then the software project is transitioned to the In Development stage when development starts. Development may then be postponed—in which case the software project is returned to the Schedule stage—or may be continued until finished, at which point the software project is transitioned to the Implemented stage. Again, if the software projects is postponed, then the software project may be transitioned to the Scheduled stage, but if Quality Assurance (QA) testing begins the software project is transitioned to the In Test stage. If the software project fails QA testing, the software project is returned to the In Development Stage; however, if the software project passes the QA testing it is transitioned to the Closed stage.

Figure 9:
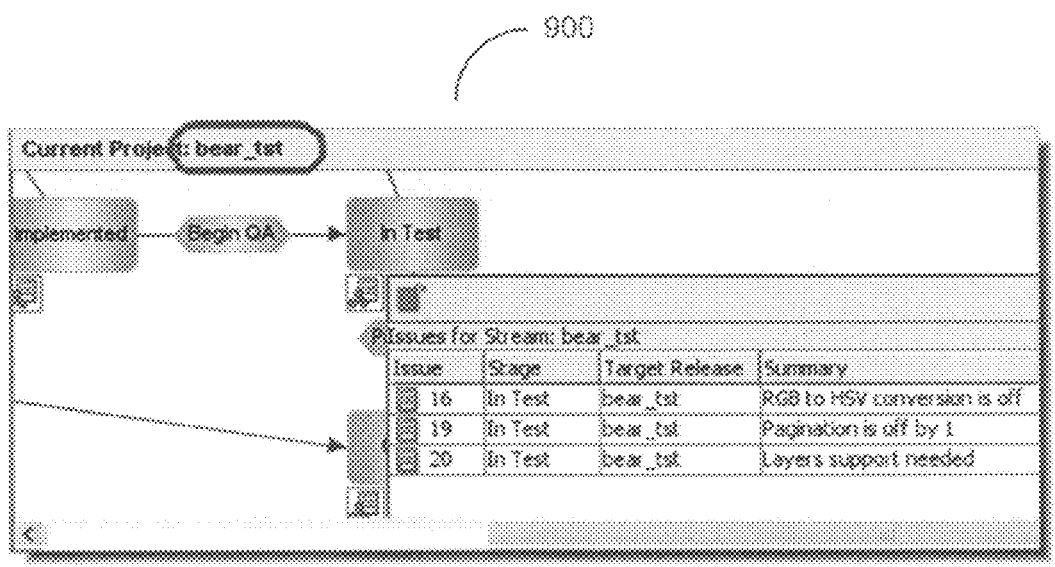
FIG. 9 is a screen shot illustrating an exemplary GUI that may be implemented by one embodiment of the invention, the GUI depicting how in some embodiments of the invention issues may be displayed in conjunction with workflow stages.

FIG. 9 shows an exemplary GUI 900 displaying issues related to a workflow stage. As mentioned above and as discussed below in greater detail, issues may be associated with workflow stages when they are considered to be "in" the workflow stage; that is, they meet the requirements of the specified workflow stage. A GUI 900 for a workflow may have a button and a display associated with each stage of the workflow such that a user may request and be supplied with the issues associated with the workflow stage. As shown in FIG. 9, there are three issues in the "In Test" stage of the "bear_tst" project: issues 16, 19, and 20. As shown in the overall workflow in FIG. 6, each of these issues may either "Fail QA" or "Pass QA" and be appropriately transitioned to "In Development" or "Closed."

To determine which issues are associated with a workflow stage, a CM application may, in some embodiments of the invention, examine properties of the issue and match them to conditions of the workflow stage. It should be apparent that how a CM application determines which issues are in a workflow stage is dependent on how records or issues and workflow stages are stored. Two exemplary processes for determining which issues are in a workflow stage are shown in FIGS. 10A and 10B, but it should be appreciated that embodiments of the invention are not limited to implementing these illustrative processes or the illustrative data structures described in conjunction with the processes, and that others are possible.

Figure 10A:
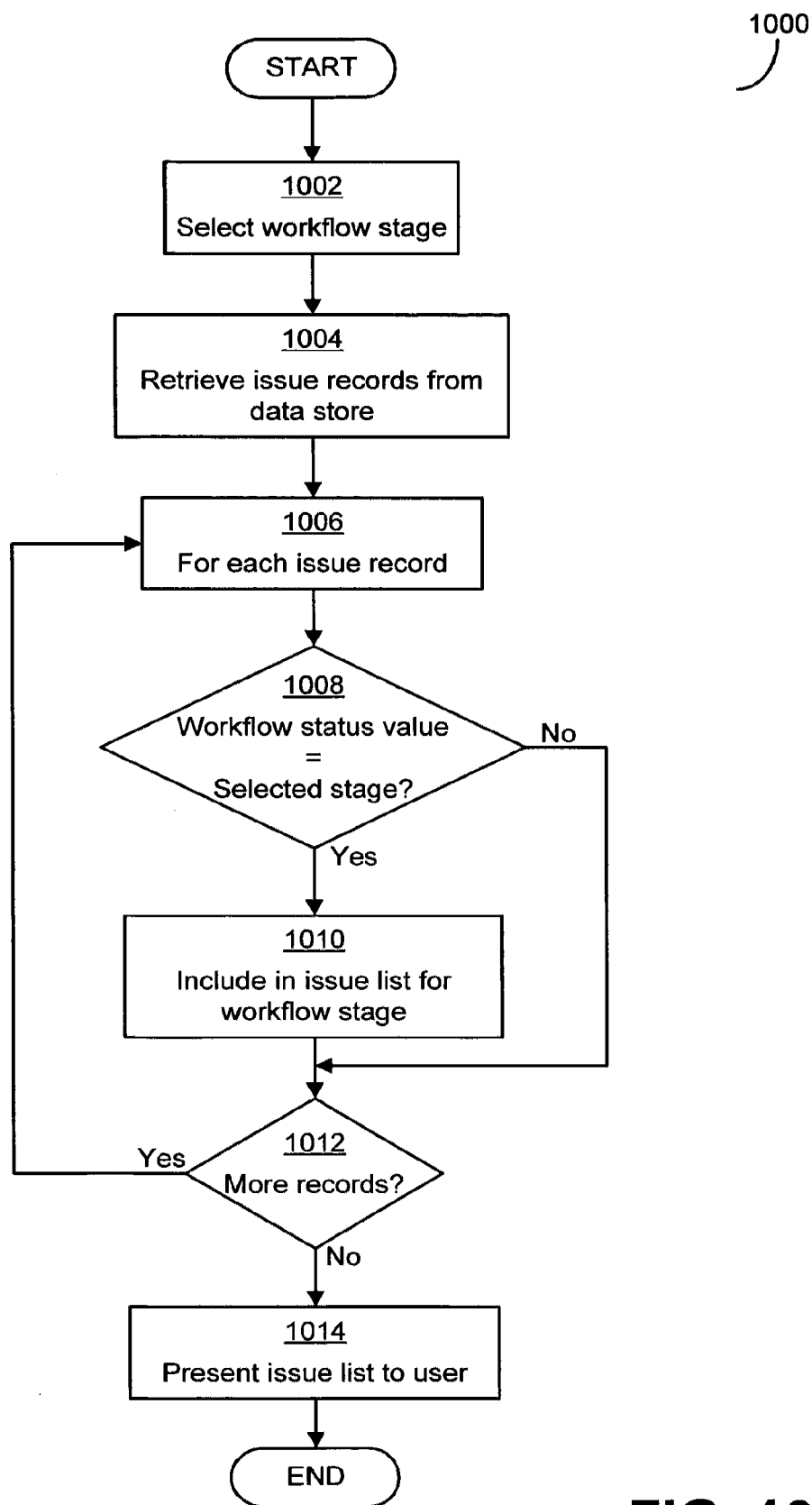
FIGS. 10A and 10B are exemplary methods for determining which issues are related to a workflow stage.
Figure 10B:
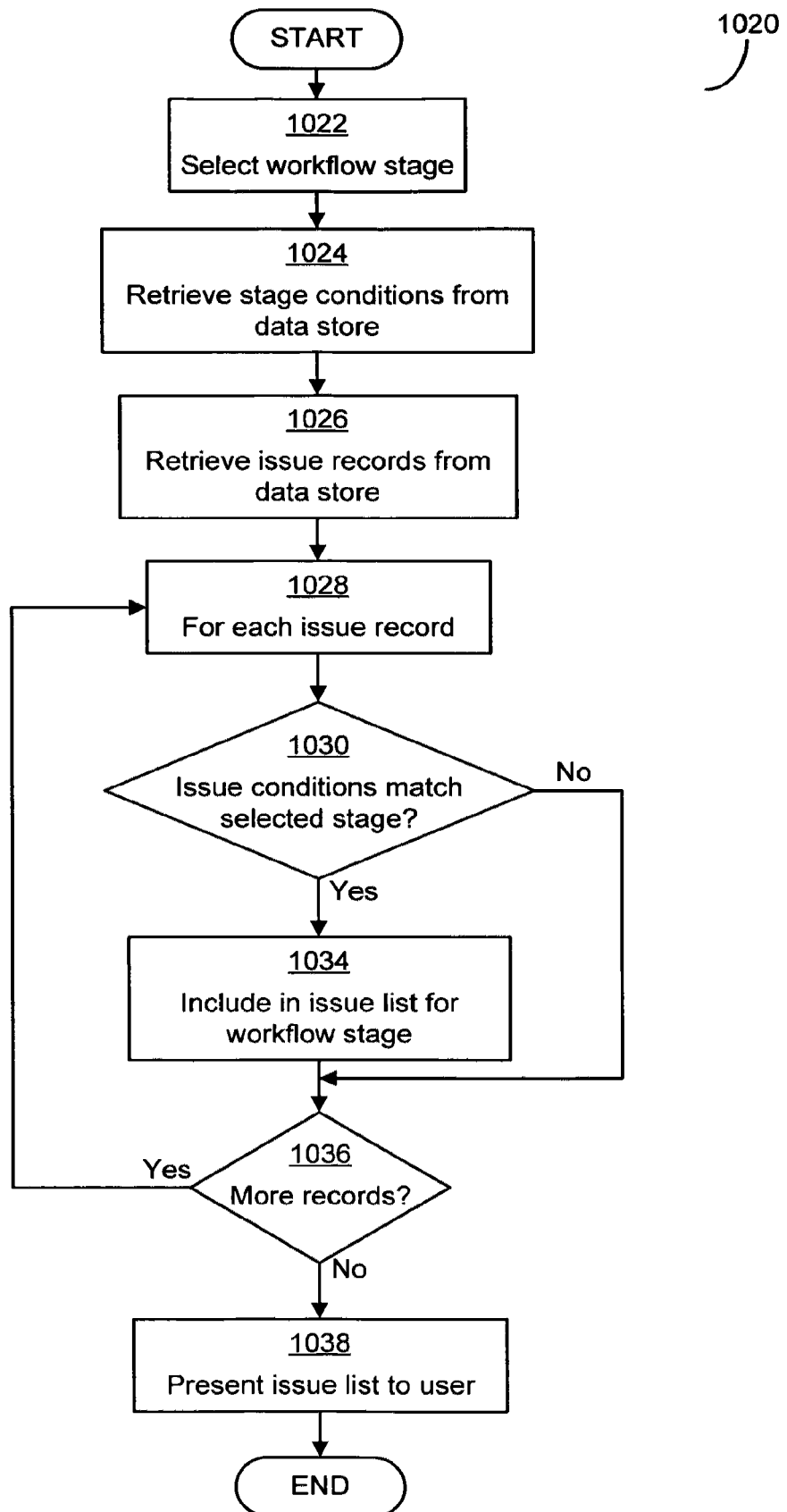

In the example of FIG. 10A, an issue record such as the exemplary record shown in FIG. 3 may comprise a field indicating a workflow status value for the issue. The workflow status value may be used to indicate a current workflow stage for an issue. For example, a newly-created issue may have a workflow status value of "Closed" while an issue being developed may have a workflow status value of "In Dvt." A workflow stage may then be defined as including an issue (i.e., the issue may be considered to be in the workflow stage) when the value of the field in the issue record matches a specified value for the workflow stage. Accordingly, a process 1000 of FIG. 10A may examine issues to determine which issues have a workflow status value matching a specified workflow stage.

The process 1000 starts with a user selecting a workflow stage in block 1002. A CM application detects the selection, and retrieves from a data store records describing issues managed by the CM application. In block 1006, the process 1000 begins examining issue records to determine whether the workflow status field of an issue matches the desired status value for the stage. If it is determined in block 1008 that an issue's status value matches the stage's status value, then in block 1010 the issue is added to the list of issues in the workflow stage. In block 1012, once the issue has been added to the list in block 1010 or it has been determined in block 1008 that the issue should not be added to the list, the process 1000 determines whether there are more issue records to examine and, if so, examines more issue records in block 1006.

If, however, it is determined in block 1012 that there are no more records to be examined, then the list of issues compiled in block 1010 may be presented to a user in any suitable format, such as in the exemplary GUI 900 shown in FIG. 9.

It should be appreciated that the process 1000 of FIG. 10A can be implemented in any suitable manner. For example, if the issue records were stored in a relational database, the database may be queried using any suitable structured query and a list of issues may be returned to the CM application. Alternatively, a CM application may retrieve from a data store a complete list of issues managed by the CM application, and the issues examined individually in a loop until all records have been examined, and the ones having matched the desired workflow status value returned to a user. A process such as process 1000 may be implemented in any suitable manner querying any suitable data store, as embodiments of the invention are not limited in this respect.

FIG. 10B shows a second exemplary process 1020 by which a CM application may determine which issues are associated with a workflow stage. In some embodiments of the invention, such as ones implementing the exemplary process 1020, a workflow stage may specify one or more conditions that must be met for an issue to be considered to be in the workflow stage. These conditions may be a value of a workflow status field of the issue, such as described above in conjunction with process 1000, or may be any other suitable value. For example, a "Scheduled" stage of the workflow 508 may specify that an issue is in the stage, and no longer in the "New" stage, if the issue contains values for the "Assigned To" and "Target Release" stages. A CM application implementing such a workflow stage may be adapted to detect when an issue meets the requirements of multiple workflow stages (e.g., an issue having "Assigned To" and "Target Release" values may be in both the Scheduled and In Dvt stages), and may determine that the issue is in any one of the stages according to any suitable decision process. For example, an issue may be determined to be in the highest stage of the workflow (i.e., farthest along in the workflow) for which it meets the requirements if it meets the requirements of multiple stages.

Conditions for a workflow stage may be specified in any suitable manner. For example, a workflow stage may have a single condition, or a workflow stage may have multiple conditions joined by logical operators such as AND, OR, XOR, etc. In this manner, an issue may be considered to be in a workflow stage if it meets each of the conditions of the workflow stage as either joint conditions or alternative conditions.

The exemplary process 1020 begins in block 1022, wherein a user selects a workflow stage. In block 1024, the conditions for the stage are retrieved from a data store maintained by the CM application, and in block 1026 records for the issues managed by the CM application are retrieved from the same or a different data store. In block 1028, the process 1020 begins examining issue records, comparing properties of the issues as contained in fields of the issue records to the conditions of the workflow stage. In block 1030, the process 1020 determines whether the properties of an issue match the conditions of the workflow stage and, if so, includes the issue in the list of issues in the workflow stage. In block 1034, once the issue has been included in the list in block 1032 or it has been determined in block 1030 that the issue should not be included in the list, the process 1020 determines whether there are more issue records to be examined. If so, the process continues to block 1028 and another issue record is examined and compared. If not, then the list of issues is, in block 1036, presented to a user. The list of issues may be presented to the user in any suitable manner, such as by the exemplary GUI 900 shown in FIG. 9.

Just as process 1000 of FIG. 10A, process 1020 may be implemented in any suitable manner. If the stage and/or issue records are maintained in a database (e.g., a relational database) then the process 1020 may include forming a structured query of any suitable type and providing the query to a database controller, then receiving the results of the query from the database controller. Alternatively, a CM application may retrieve from a data store a complete list of issues managed by the CM application, and the issues examined individually in a loop until all records have been examined, and the ones having matched the desired workflow status value returned to a user. A process such as process 1020 may be implemented in any suitable manner querying any suitable data store, as embodiments of the invention are not limited in this respect.

It should be further appreciated that a CM application may store any suitable information about a relationship between workflow stages and issues (or other objects managed by a workflow) that may be used in determining whether an issue is included in a stage. For example, a CM application may maintain a record of workflow stage and issues associated with the workflow stage such that a user seeking to determine issues included in a workflow stage may query to record to quickly determine the issues.

As discussed above, workflow stages may be related to one another by workflow transitions. A workflow transition may define permissible routes an object (e.g., an issue) may take through a workflow. For example, the workflow 508 illustrates that a "New" issue may transition to "Scheduled" or "Closed," but may not directly transition to "In Dvt."

A workflow transition may define one or more actions that should be taken or one or more conditions that must be met for an object (e.g., an issue) to "move" from one workflow stage to another. For example, if a destination stage of a workflow transition indicates that a certain value is required for a field for the object to be included in the workflow, the transition may prompt a user for a value of the field. As an example of this, the Scheduled stage may stipulate in its conditions that an issue store any value in its "Assigned To" and "Target Release" fields (i.e., any value may be stored, as long as the field is set to a value). The "Schedule" transition may, therefore, store an indicator that if the transition is being applied to the issue, then the user should be prompted for values of "Assigned To" and "Target Release" if the fields are not set.

Transitions may be defined in conjunction with workflow stages, and may require actions to be taken which are related to the source and/or destination stores of the transition. In some embodiments of the invention, a workflow transition may determine the actions to be taken when it is applied from conditions and properties of the objects managed by the workflow and the source and/or destination stages of the transition, while in other embodiments of the invention a user may be prompted to define actions to be taken when a transition is applied.

Figure 11:
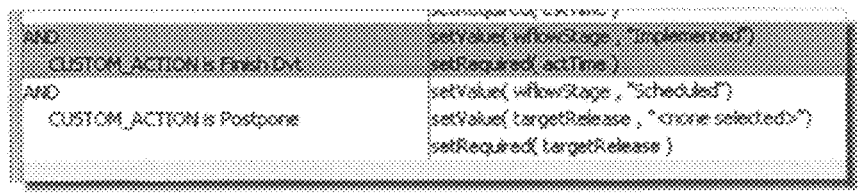
FIG. 11 is an exemplary table displaying exemplary actions which may be taken by a CM system in response to an issue being transitioned.

FIG. 11 shows a description of two exemplary workflow transitions, the "Finish Dvt" and "Postpone" transitions of workflow 508. In the CM application managed the illustrated workflow transitions, an issue record may be maintained with a field storing an indicator of a workflow stage the issue is in. In this manner, both workflow transitions illustrated by FIG. 11 include an action to be taken by the CM application setting a value of the wflowStage field of the issue record to a value indicating a destination stage of the workflow transition. The Finish Dvt transition further includes an action setting a field of the issue as required; in this case, the actTime field of the issue is required to be set when the record is applied. The actTime field may indicate an actual time the action was taken (i.e., a time the workflow transition was applied) and is to be set by a user or the CM application. The Postpone transition, as part of a postpone process, clears a value of the targetRelease field of an issue record and further indicates to the CM application, through a setRequired function, that the targetRelease field is required to hold a value.

Figure 12:
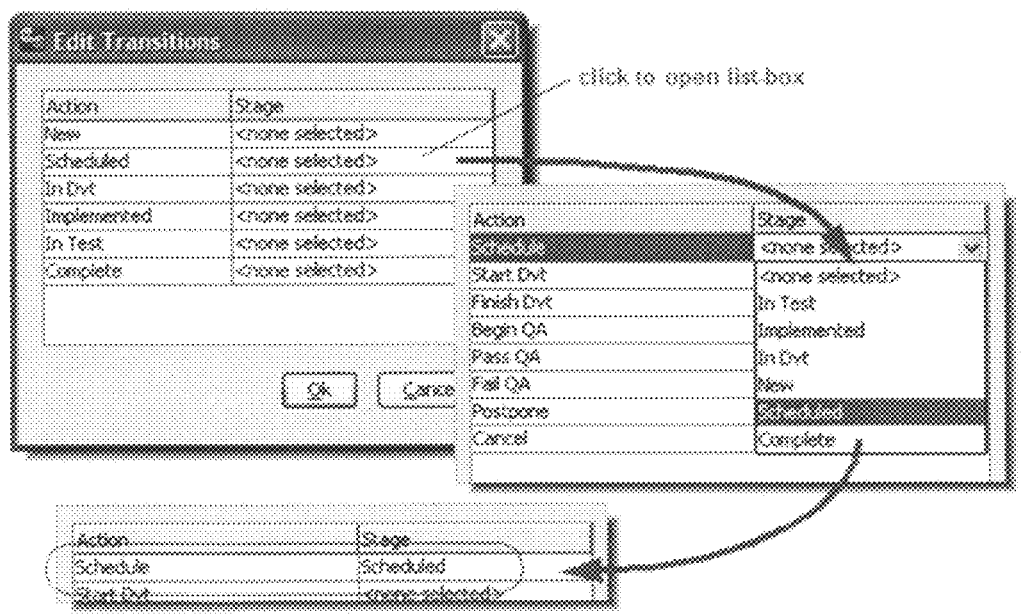
FIG. 12 is an exemplary GUI for a CM system that may be implemented by one embodiment of the invention, in which the GUI may be used to define actions to be taken by the CM system in response to an issue being transitioned.
Figure 13:
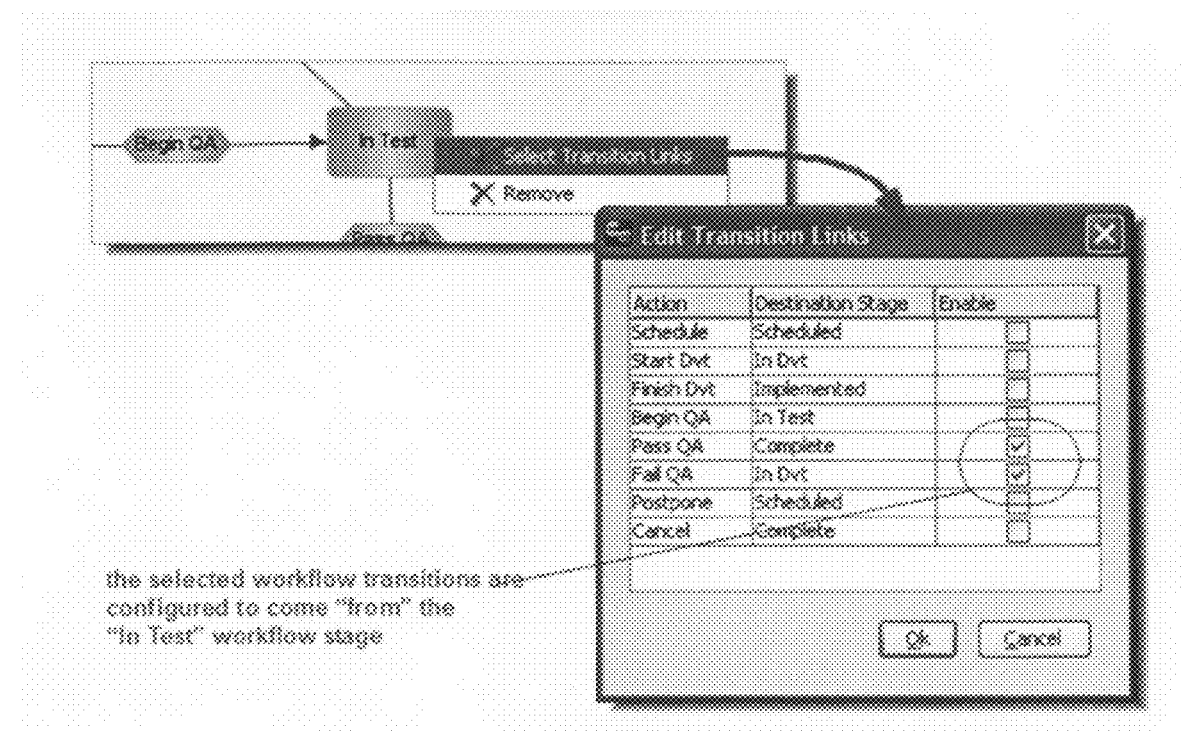
FIG. 13 is an exemplary GUI for associating transitions with a workflow stage that may be implemented by one embodiment of the invention.

Workflow transitions may be related to workflow stages in any suitable manner. For example, in some embodiments of the invention, workflow transitions may be defined separately from workflow stages. Once both are defined, they may be related to one another. FIG. 12 shows an exemplary GUI for relating workflow transitions to workflow stages by defining a destination stage for a workflow transition. A user may be presented with a list of workflow transitions defined by the CM application and may then be provided (in the example of FIG. 12, by a drop-down box) with a list of workflow stages to which the workflow transition may be related as a destination stage. FIG. 13 shows an alternative GUI implementing an additional or alternative technique by which workflow stages and workflow transitions may be associated in some embodiments of the invention. In the technique of FIG. 13, a user may select a workflow stage and then select from available, predefined workflow transitions having actions and destination stages which of the workflow transitions should be associated with the selected workflow stage as a source stage for the workflow transitions. While in FIG. 12 a user could only select a single workflow stage to be associated with a workflow transition as a destination stage (because workflow transitions are unidirectional), in FIG. 13 a user may select as many workflow transitions as are defined to be associated with the workflow stage as a source. The user may indicate which transitions he or she wishes to associate with the workflow stage by "enabling" them in the GUI (i.e., checking the enable box).

It should be appreciated that these techniques of FIGS. 12 and 13 for relating workflow stages and workflow transitions are merely exemplary, and that information relating workflow transitions to workflow stages may be determined in any suitable manner. For example, a user may be required by a CM application to define a workflow transition for a workflow stage when the workflow stage is created, such that the stage may be related to the remainder of the workflow, and/or a user may be similarly required to define a workflow stage when a workflow transition is created. Further, the information regarding the association may be stored in any suitable manner (e.g., any suitable data structure(s)) on any suitable computer-readable medium or media.

Figure 14:
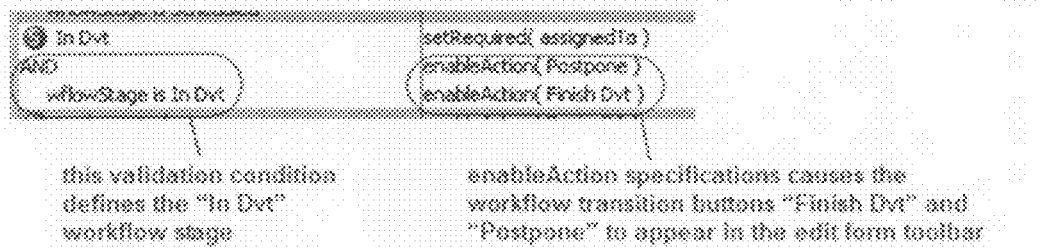
FIG. 14 is an exemplary GUI that may be implemented by one embodiment of the invention, the exemplary GUI displaying properties of an exemplary workflow stage, the properties including conditions for an issue to be in the stage, transitions associated with the stage, and required properties of an issue in the stage.

Additionally, workflow transitions and workflow stages may, in some embodiments of the invention, be associated with issues. FIG. 14 shows actions which may be taken when an issue is considered to be in a workflow stage, though it should be appreciated that actions may also be taken with respect to an issue when the issue is transitioned to the workflow stage in the workflow. In the embodiment shown in FIG. 14, when an issue is determined to be in the In Dvt workflow stage (which, in the example, is when the workflow status value of the issue record matches the specified value, "In Dvt"), workflow transitions Postpone and Finish Dvt are enabled for the issue. In this manner, when an issue is viewed or edited, a user may be given the option to transition the issue in the workflow by applying the Postpone and Finish Dvt transitions. A workflow stage may take any other suitable action when an issue is detected to be in the workflow stage, such as by disabling workflow transitions or taking any other suitable action. A record of these actions may be stored in any suitable manner, such as by one or more fields in the issue record indicating workflow transitions enabled for the issue.

Figure 15:
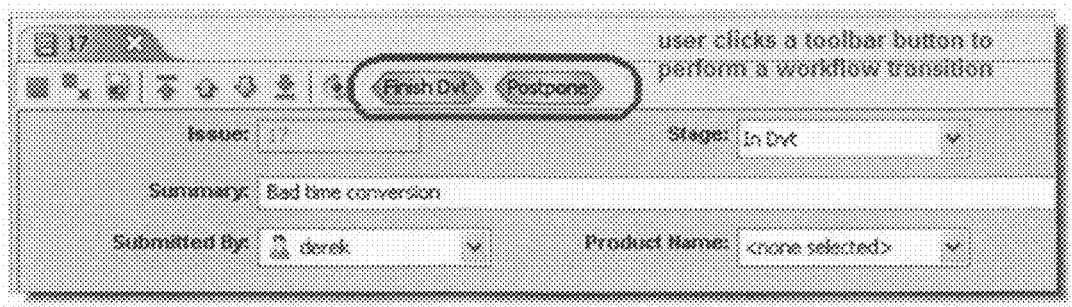
FIG. 15 is an exemplary GUI that may be implemented by one embodiment of the invention, the GUI displaying properties of an issue and actions that may be taken by the system in regard to the issue including applying one or more transitions to the issue.

A result of actions specified by a workflow stage may be presented to a user in any suitable manner, such as by the exemplary GUI shown in FIG. 15. FIG. 15 shows a GUI that may be implemented by some embodiments of the invention to present information stored in an issue record, such as issue number, issue name and/or description, an indication of the responsible party or to whom the issue has been assigned, and a product name for the target release. The GUI of FIG. 15 additionally shows two workflow transition buttons which a user may use to apply the workflow transition to the issue, in this case Finish Dvt and Postpone, as specified by the actions contained in the record shown in FIG. 14. Embodiments of the invention may alternatively or additionally present the workflow transition buttons to a user in the GUI shown in FIG. 9 or a GUI related to the GUI shown in FIG. 9, such as in a context menu displayed to a user when the user requests more information on an issue record displayed in GUI 900 by, for example, right-clicking an issue record displayed in the GUI. It should be appreciated, however, that these techniques are merely exemplary, and that embodiments of the invention which relate workflow stages and transitions to issues may relate them and display the relationship between them in any suitable manner.

Information describing a workflow may be stored in any manner. This information may comprise any data and/or instructions associated with the workflow, including one or more of the stages of the workflow, transitions of the workflow, actions to be taken related to stages and transitions, and an appearance of the workflow in a GUI, among other types of information. In some embodiments of the invention, information regarding a workflow may be stored in a single file structured according to the Extensible Markup Language (XML) standard, though in alternative embodiments of the invention this information may be stored in any suitable number of files in any suitable format. An illustrative example of this structure is now given, wherein the information is stored in a single XML file, though it should be appreciated that the invention is not limited in this respect.

In some embodiments of the invention, information may be structured in an XML file according to a series of conditionals. The series of conditionals may define not only characteristics of a workflow or elements of a workflow, but also actions to be taken in the workflow or any other suitable information. For example, a New stage of the workflow 508 may be described in the XML file as:

```
<if id="1" title="New" x="728" y="60">
    <condition>
        <term>status=="New"</term>
    </condition>
    <actions>
        <enableAction>
            <action title="Cancel" x="836" y="68"/>
            <action title="Schedule" x="724" y="8"/>
        </enableAction>
    </actions>
</if>
```

In this example, a workflow stage is defined as having a unique identifier 1, and in the GUI it has a title "New" with a box placed at the designated <x,y> coordinates. The unique identifier for the workflow stage may be assigned when the workflow stage is created, and may be any suitable identifier, such as alphabetic, numeric, or alphanumeric. When a CM application is first loaded, it may load the XML file and retrieve from it a description of the workflow managed by the CM application, and use records such as this exemplary record to define the stages of the workflow. The record also defines the conditions in which an issue may be determined to be in the "New" stage—in this case, if a status field of the issue record holds the value "New." Lastly, the record for the workflow stage in this illustrative example defines the actions that may be enabled for the issue in the workflow; in other words, the transitions that are be related to the workflow stage. In the example, the "Cancel" and "Schedule" transitions are associated with the workflow stage New.

Workflow transitions may also be defined in the single XML file:

```
<if>
    <condition>
        <AND>
            <term>"CUSTOM_ACTION"=="Schedule"</term>
        </AND>
    </condition>
    <actions>
        <setValue field="status" value="Scheduled/>
        <setValue field="state" value="Open"/>
    </actions>
</if>
```

The transition record of this example defines a workflow transition for the workflow. The definitions includes information describing how a CM application is to react when the Schedule transition is applied to an issue. In the example, the CM application would set the value of two fields of the issue record; namely, the status field would be set to Scheduled and the state field would be set to Open.

A data structure defining a workflow may store any suitable information, including information describing actions to be taken according to various conditions of an issue. For example, the XML file may define how a CM application should react to various conditions of issue records:

```
<if>
    <condition>
        <term>status=="Scheduled"</term>
    </condition>
    <actions>
        <setRequired>
            <field>AssignedTo</field>
            <field>priority</field>
            <field>targetRelease</field>
            <field>severity</field>
        </setRequired>
    </actions>
</if>
```

In this example, the record defines an action that is to be taken by the CM application if an issue record has a status of Scheduled (as defined by the value of a "status" field in the issue record). In the example, if the condition is met, then the CM application defines four fields of the record (assignedTo, priority, targetRelease, and severity) as "required," meaning that the fields must have values before any changes will be written to disk. A record of this type may take any suitable action according to any suitable condition or conditions. For example, the following record defines actions that should be taken when the value of the assignedTo field of a record is changed:

```
<if>
    <condition>
        <AND>
            <term>oldValue(assignedTo) !=assignedTo</term>
            <term>assignedTo !="0"</term>
            <term>dateAssigned==" "</term>
        </AND>
    </condition>
    <actions>
        <setValue field="dateAssigned" value="CUR_DATE"/>
    </actions>
</if>
```

In this example, when a value of the assignedTo field changes (when the assignment of an issue changes), and the assignment is to another user (i.e., the assignment is not to no one, indicated by a placeholder 0), and the dateAssigned field is empty, then the CM application should populate the dateAssigned field of the issue record with the current date from the environment variable CUR_DATE. As shown in this example, a record may set multiple conditions joined by a tag indicating one or more logical operators relating the conditions. Records may employ any suitable logical operator or logical operators in defining conditions for the record.

As discussed above, it should be appreciated that embodiments of the invention may store information regarding a workflow in any suitable manner, as embodiments of the invention are not limited in this respect. In accordance with embodiments of the invention, information regarding a workflow may be stored in any suitable type or types of data stores in one or more files according to one or more formats, or in any other suitable manner. Further, in embodiments of the invention storing information in one or more XML files, it should be appreciated that the illustrative structures defined above are merely exemplary, and the embodiments of the invention may define any suitable XML structure(s) for data to be stored in the one or more XML files.

In some embodiments of the invention, one or more workflow transitions of a workflow may also be associated with one or more versions of a software project related to the workflow and managed by the CM application. In this manner, when an issue is promoted between versions in a software project, the issue may also be transitioned in the workflow. Relating workflow transitions and versions in this manner permits the CM application to maintain consistency between issue records for a workflow and issue records for a software project.

This relationship may be established and stored in any suitable manner, as embodiments of the invention are not limited to any particular technique or techniques for establishing and/or storing this relationship. FIG. 16 shows an exemplary data structure that may be implemented by embodiments of the invention to relate a workflow transition to a version of a software project. The exemplary data structure 1600 of FIG. 16 is in XML format, and may be stored in an XML file specific to the data structure (i.e., not storing any other information) or in an XML file storing other information such as the information describing the workflow described above. It should be appreciated that while in some embodiments of the invention may store information relating workflow transitions to versions of software projects in an XML data structure, embodiments of the invention are not limited in this respect and may store the information in any suitable manner such as in a database table.

In the data structure 1600 of FIG. 16, a workflowLinks node comprises a single project node (line 2 of the data structure 1600) identifying the transition/version pairs associated with the software project having a unique ID of 5 (as indicated by "<project ID='5'>"). In some embodiments of a system implemented according to some aspects of the invention, each of one or more software projects managed by a CM application may be associated with an entry in the data structure, such that each of the software projects may have a specific pairing of versions of the software project to workflow transitions. For example, with reference to FIG. 1, a workflow transition may be associated with stream 106 for Project A, but the same workflow transition may be associated with stream 116 for Project B.

Alternatively, in some embodiments of the invention, there may not be a specific relationship developed for each software project. Instead, workflow transitions may be associated with specific levels of a version hierarchy, such that the relationships between workflow transitions and versions may be essentially the same between all software projects managed by a CM application. For example, all software projects managed by a CM application may be required to have a same basic structure, such as the structure of Projects A and B, and versions at specific levels of the structure (e.g., versions 106 and 118 of Projects A and B, respectively) may be associated with a workflow transition by virtue of their location in the version hierarchy.

In embodiments of the invention which do store specific transition/version pairs for software projects, a project node of the XML data structure may have one or more nodes identifying versions to be related to a workflow transition. In embodiments of the invention which implement versions as streams, these nodes may be implemented as originating streams. An originating stream is a stream in a software project from which issues (and associated files) are promoted, as opposed to a destination stream, which is the version/stream to which the issues/files will be promoted. As discussed above, "promotion," in the context of issues is an act of moving an issue from one version to the next higher version in a version hierarchy (e.g., moving an issue from version 106 to version 104).

An indicator of an originating stream, rather than only the destination stream, is stored in the data structure to prevent any ambiguity that may result in some workflows and software projects, such as the ambiguity described below. It should be appreciated that not all workflows and software projects experience this ambiguity, and thus embodiments of the invention are not limited to storing an indicator of an originating stream in the data structure.

Without an indicator of an originating stream, ambiguity may result, for example, in the case of a software project having a version hierarchy (e.g., stream hierarchy) with one or more levels where a single version is related to a plurality of lower-level versions. For example, in the version hierarchy 100A of FIG. 1, each of the workspaces 108 (i.e., the plurality of lower-level versions) is related to the version 106 (i.e., the single version). When an issue is promoted to the single version, then, the issue may come from any of the plurality of lower-level versions. It may be unclear, then, from which of the lower-level version the issue (and any associated data such as indicators of software components related to the issue, etc.) should be retrieved. It should be appreciated, however, that in software projects each version is only directly associated with one higher-level version. For example, in FIG. 1, each stream in the stream hierarchy 100A is directly "below" only one other stream in the stream hierarchy (version 104 is directly below version 102, version 106 is directly below version 104, and each of the workspaces 108 is directly below version 106). Thus, while each version may be related to a plurality of lower-layer versions, each of the plurality of lower-level versions is only related to one higher-level version. This means that each of the lower-level versions always promotes issues/files to the same version. In such embodiments, then, to clear up any ambiguity as to the source of issues/files being promoted, the originating version of a promotion may be identified in the data structure.

In the data structure 1600 of FIG. 16, each originating stream node (e.g., line 3 of the data structure 1600) then has a link node (e.g., line 4) comprising information related to a link between the originating stream and a transition (e.g., line 5) in the workflow. This information may, in some embodiments, comprise a suitable identifier for the transition such as the name of the transition or another unique identifier, as well as the source stage for the transition. As discussed above in conjunction with a software project and version hierarchies, in some embodiments of the invention, a transition may be associated with multiple source stages and one destination stage, which may lead to ambiguity in how to apply a transition. For example, the "Postpone" transition shown in workflow 508 connects both the "In Dvt" and "Implemented" stages to the "Scheduled" stage. Thus, in these embodiments, to identify accurately a transition to be applied, both a transition (e.g., line 3) and a source stage (e.g., line 7) should be identified. It should be appreciated, however, that some embodiments of the invention may not suffer from this ambiguity, and thus may not store the same type or types of information as those that do, and further that embodiments of the invention may store any type or types of information to resolve this ambiguity as embodiments of the invention are not limited to storing any particular information in the data structure.

In some embodiments of the invention, then, to link a workflow transition to a version of a software project, the CM application may store identifiers for a project, a source version, a source stage in a workflow, and a workflow transition. In this manner, a version and a transition can both be uniquely identified. In alternative embodiments of the invention, however, more or less information may be used to identify a source version and/or workflow transition. It should be appreciated, then, that embodiments of the invention are not limited to storing any particular type or types of data, as embodiments of the invention may store any suitable data to identify versions and transitions, so long as the data is sufficient to do so. For example, rather than (or in addition to) linking source versions to transitions, a CM application may link destination versions to transitions.

Creating an entry in the data structure 1600 of FIG. 16 may be done in any suitable manner. In some embodiments of the invention, a user may manually enter information describing a relationship between a transition and a version (e.g., may manually enter the data appearing in the data structure). Additionally or alternatively, in some embodiments of the invention a user may interact with any suitable GUI to establish a relationship and define an entry in the data structure 1600. For example, the GUI 500 may enable a user to select a transition in the workflow and through a button or menu selection indicate that the user wants to establish a relationship between that transition and a stream. The GUI 500 may then allow the user to make a selection of a desired stream from frame 502 of the GUI 500, after which the CM application may define the entry in the data structure 1600. The GUI 500 may alternatively allow a user to perform a similar operation by first selecting a version in the software project and then a transition in the workflow.

Figure 16A:
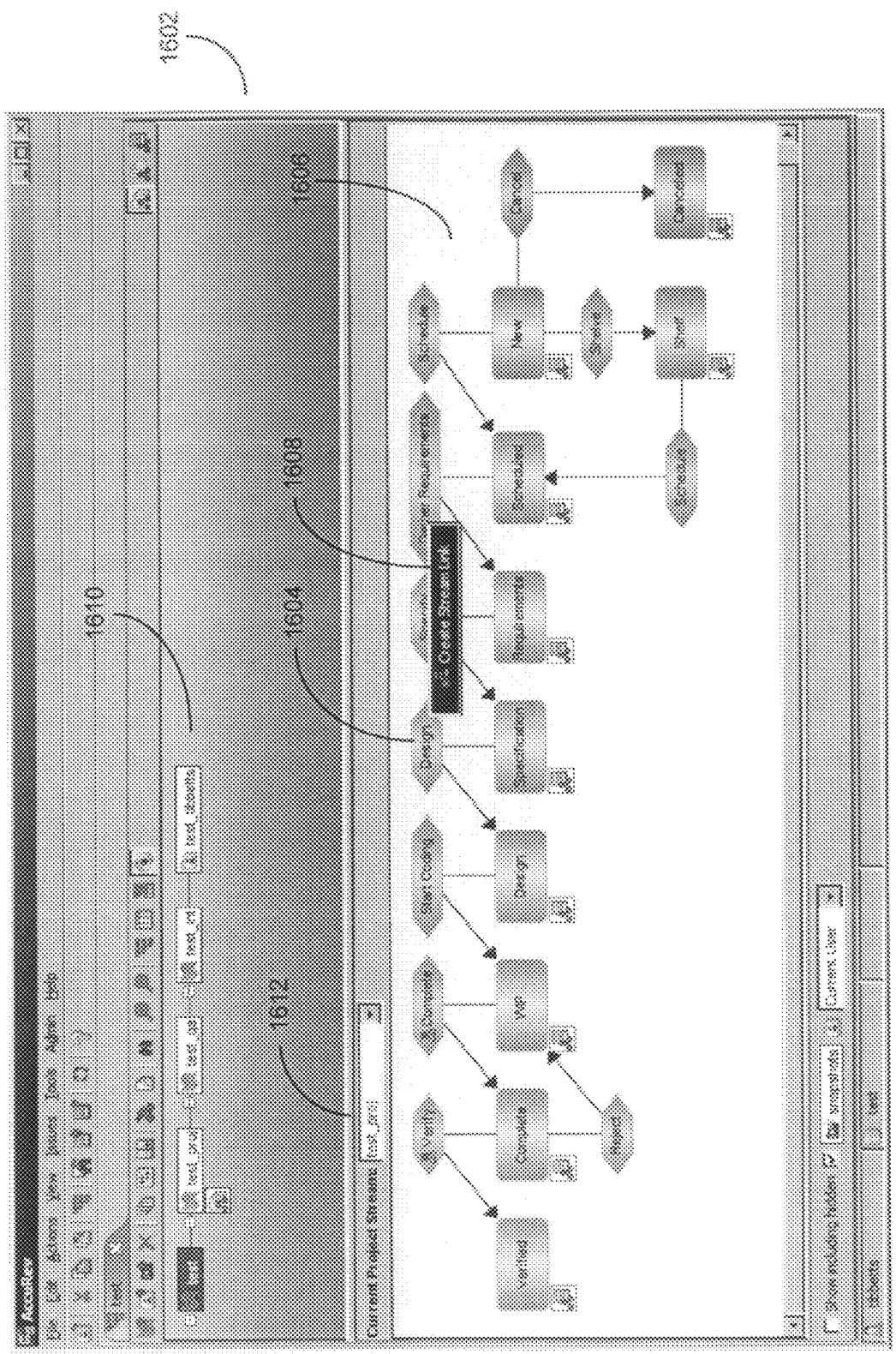
FIG. 16A is an exemplary GUI which may be implemented by one embodiment of the invention to permit a user to define a relationship between transitions and streams.

In embodiments of the invention which permit a user to define a relationship between a transition and a version through use of a GUI, any suitable GUI may be used. FIG. 16A shows an exemplary GUI 1602 of a CM application, which may be used in some embodiments of the invention to define this relationship. In the example, for clarity, versions are implemented as streams, though it should be appreciated that embodiments of the invention are not limited to implementing versions as streams, nor are embodiments of the invention which implement a GUI for defining a relationship between a workflow transition and a version limited to implementing versions as streams.

In the exemplary GUI 1602, a user has right-clicked on a transition 1604 in the workflow 1606 to display a menu 1608. The menu 1608 displays to the user the option to "Create Stream Link" between a transition and a stream of the stream hierarchy 1610. If the user selects to create a stream link (by, for example, selecting the option in the menu), then the GUI 1602 may prompt the user to select a stream in the stream hierarchy 1610. Selecting a stream may be done in any suitable manner, such as by single-clicking on a stream upon being prompted, or selecting a stream from a list. Once a user has selected a transition and a stream, the GUI 1602 may provide the information to a process of the CM application to store the information in the data structure 1600 and create the relationship. The selected transition 1604 is stored as the transition (e.g., line 5 of the data structure 1600 of FIG. 16) associated with the selected stream (e.g., line 3). The originating workflow stage for the transition may also be stored (e.g., line 7). In some embodiments of the invention, as discussed above, a user may be further prompted to provide an identifier of a software project with which the transition and the stream are related. In the exemplary GUI 1602, a user may be permitted to provide this information through drop-down box 1612, though it should be appreciated that, if this information is necessary for the data structure, this information may be provided in any suitable manner.

Exemplary techniques for defining a relationship between a version and a workflow transition have been described (e.g., matching transitions to levels of a version hierarchy, manual entry of data, and specification of data through a GUI). It should be appreciated, however, that these techniques are merely illustrative; and any suitable technique for specifying a relationship between a workflow transition and a version may be implemented, as embodiments of the invention are not limited to any particular technique.

Figure 17:
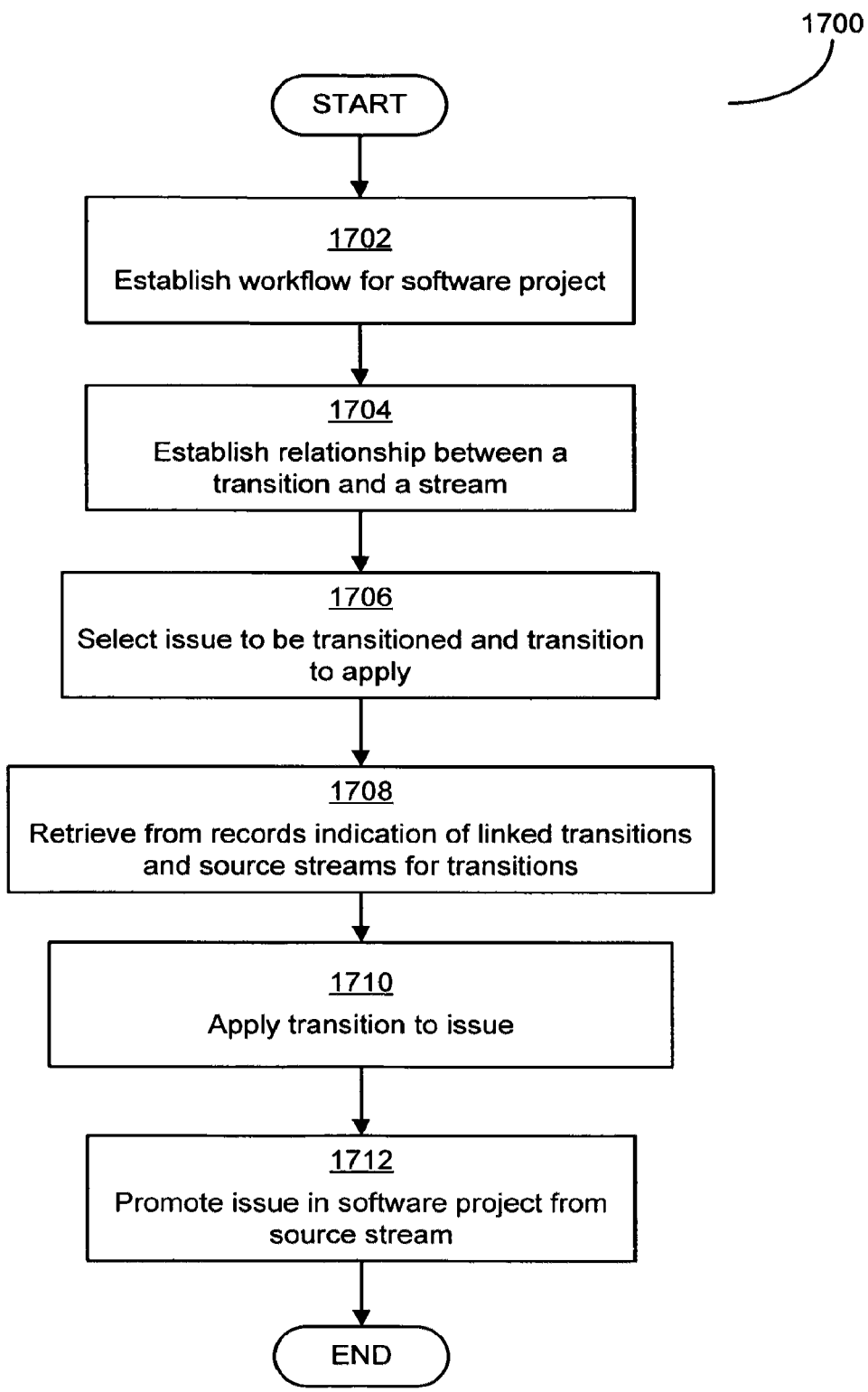
FIG. 17 is a flowchart of an illustrative method which may be implemented by embodiments of the invention for applying a transition to an issue.
Figure 18:
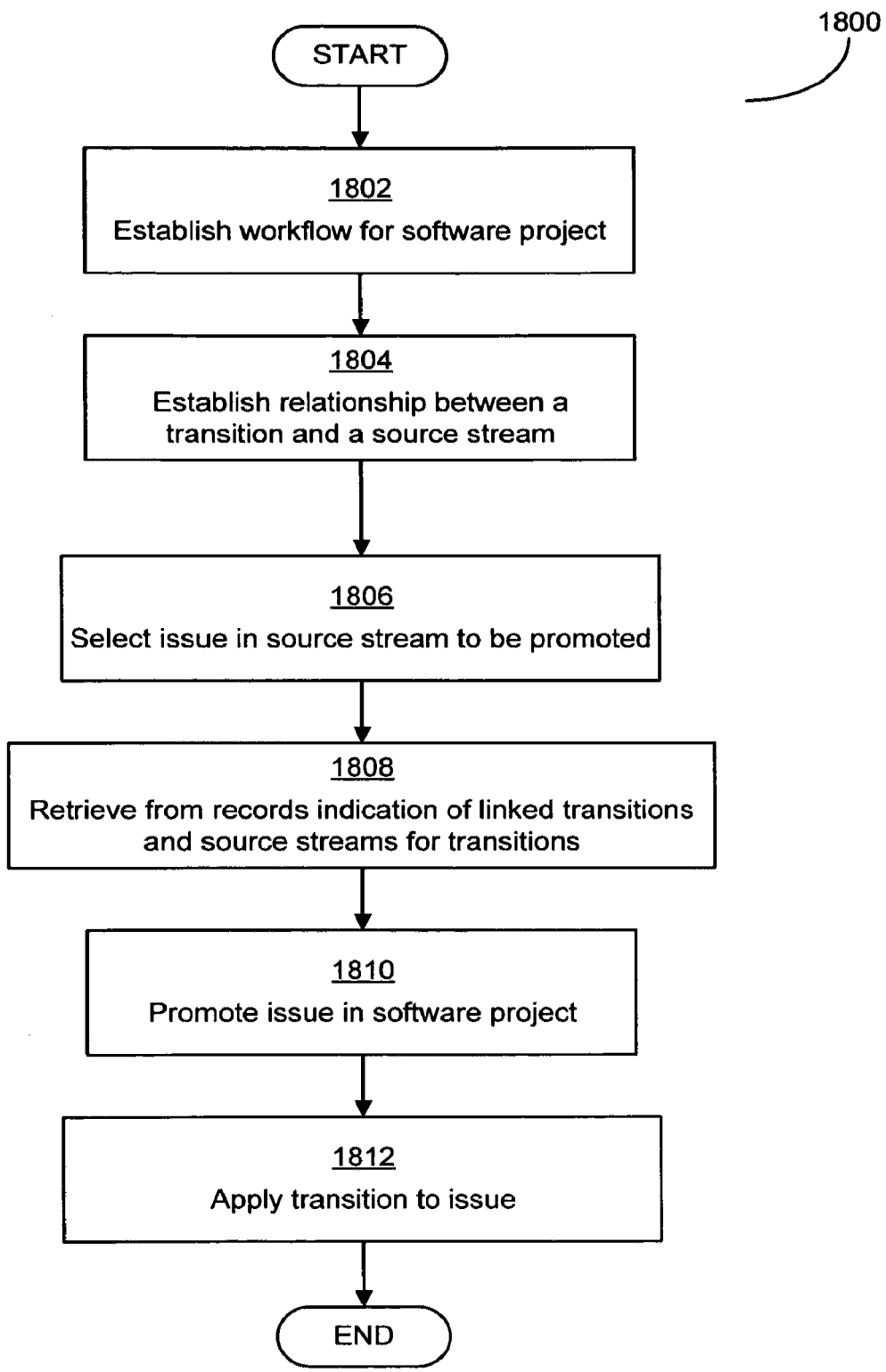
FIG. 18 is a flowchart of an illustrative method which may be implemented by embodiments of the invention for applying a transition to an issue when it is detected that all parts of the issue have been promoted to the transition's destination stream.

Once an entry in the data structure 1600 is created, defining a relationship between a workflow transition and a version in a stream hierarchy, processes may be implemented by a CM application which make use of the relationship. FIGS. 17 and 18 show exemplary processes that may be implemented by CM applications, though it should be appreciated that embodiments of the invention are not limited to implementing these exemplary processes or any other process. Embodiments of the invention may not implement any process taking advantage of the relationship, or may implement any suitable process making use of the relationship, as embodiments of the invention are not limited in this regard.

For clarity, the illustrative processes described below will be described as operating with embodiments of the invention which implement versions as streams. It should be appreciated, however, that embodiments of the invention may implement versions in any suitable manner, and that processes may be implemented which interact with versions according to the manner in which the versions are implemented.

The process 1700 of FIG. 17 begins in block 1702 with the initial step of establishing a workflow for a software project. Establishing a workflow may be done in any manner, such as by loading a description of workflow stages and transitions from a file or accepting input from a user regarding workflow stages and transitions which should be implemented. Establishing a workflow for a software project may also comprise defining a software project with which a workflow will operate. As part of defining a workflow, an empty data structure, such as the data structure 1600 of FIG. 16, may be created, which will be populated in any desired manner and modified to define relationships between workflow transitions and versions of a software project.

After a workflow is established in block 1702, a relationship is established in block 1704 between a version/stream of the software project and a transition of the workflow. The relationship of block 1704 may be established in any suitable manner, including the exemplary techniques discussed above. For example, a user may select the "Finish Dvt" transition in the workflow 508 of FIG. 6 and relate it to the user's workspace (e.g., set an originating stream for a promotion associated with the transition to be workspace 110 of version hierarchy 100A).

After the establishment of relationship between a transition of a workflow and a version of the software project in blocks 1702 and 1704, a CM application may take advantage of the relationship to maintain consistency in records and status reporting. In block 1706, a user may select an issue to be transitioned from one workflow stage to another. For example, the user may select an issue to be transitioned from "In Dvt" to "Implemented" in the workflow 508 of FIG. 6. The transition between these stages is the "Finish Dvt" transition, which had been linked to an originating stream in block 1704. The process 1700 in block 1708 retrieves from the data structure 1600 data regarding which transitions have been linked to streams in the software project. The process examines the information, and will find that the entry, created in block 1704, relating the "Finish Dvt" transition to the originating stream workspace 110. In block 1710, the process 1700 applies the selected transition to the issue, which may comprise taking one or more actions associated with the transition (e.g., changing a value of a field in the issue record, as shown in FIG. 11) or associated with the destination stage of the transition (e.g., prompting a user for a value for a field required to be populated for issues in the stage). In block 1712, according to the entry in the data structure 1600, the selected issue is also promoted in the software project, meaning the issue is promoted one level in the stream hierarchy of the software project. The CM application locates the issue in the destination stream and identifies files associated with the issue by examining the originating stream entry in the data structure 1600 associated with the transition and any records associated with the issue maintained by the CM application. Issue promotion may be done in any suitable manner, such as by changing a virtual version of a file in the destination stream (Project A (Dev't) 106) to correspond to indicate a real version of the file created in workspace 110, by adding a file to stream 106, applying a change package associated with the issue to stream 106, or by taking any other suitable action. Once all actions associated with the workflow transition have been completed, and all files/changes associated with the issue in the software project have been applied to the destination stream, the process 1700 ends.

Additionally or alternatively, in some embodiments of the invention a CM application may be adapted to transition an issue in a workflow when the issue is promoted in the software project. In some embodiments of the invention, this process may be similar to the process 1700 for promoting an issue is a software project when the issue is transitioned in the workflow, but embodiments of the invention are not limited to implementing any particular process for transitioning an issue in a workflow and may take any action or set of actions to transition an issue in a workflow when the issue is promoted in the software project.

As an example of the effects of a process such as the exemplary process 1700 of FIG. 17, FIGS. 17A-17D show data structures before and after the execution of the process. In FIGS. 17A and 17B, exemplary issue records 1720 and 1722 similar to those shown in FIGS. 3 and 4 are shown. Each issue record maintains an issue number, an issue name, an indicator of a developer to which the issue has been assigned, a target release for the issue, and an issue status in the workflow. As described above, the status of an issue may either be stored directly in the issue record, or may be determined from the data stored in the issue record (e.g., an issue record may be considered to be in the "New" stage until it has values for the "Assigned To" and "Target Release" fields, at which point it may be considered to be "Scheduled"). The issue records 1720 of FIG. 17A show issue 1 is in the "In Dvt" stage, meaning in this example that it is in the workspace of the developer to which it is assigned (Dev 1, in this case). FIG. 17B shows these issue records following the process described above, in which an issue (here, issue 1) is transitioned from "In Dvt" to "Implemented" by way of the "Finish Dvt" transition. As shown in FIG. 11, the actions associated with the "Finish Dvt" transition include changing a value of the status field in the issue record to "Implemented." In FIG. 17B, the issue record for issue 1 shows that the value of the "Status" field has been updated to "Implemented," showing that the transition has been applied. Thus, when a developer queries the "Implemented" workflow stage for issues associated with it, issue 1 may be included in the list.

Additionally, as discussed above, the process 1700 promotes the issue in the software project when the transition is applied, as a result of the relationship established between the transition and a stream. FIG. 17C shows a record 1726 of real and virtual versions of software components of a software component, similar to Table I above. Real and virtual versions are discussed in greater detail above, but in summary, a real version is a new version of a software component which may be created in a workspace by creating a new software component or modifying an existing software component, while a virtual version is a pointer to a real version created when a real version is promoted to another stream. As shown in the record for the software component having an Element ID of 2, the first real version of the file was created in Stream 4 (the workspace for Dev 1, as shown in Table II above). In FIG. 17D, it can be seen in the records 1728 that a new virtual version has been created for the software component 2, which is the first version (Instance ID is 1) in stream 3 (Project Act—Dev't 106) and points to the first real version (edition ID is 1) in stream 4. Accordingly, it can be seen that the real version 4/1 was promoted from the workspace stream 110 (with a stream ID of 4) to the stream 106 (with a stream ID of 3) to create the virtual version 3/1.

It should be appreciated that the above example is merely illustrative of actions that may be taken and data that may be stored and/or edited in response to a transition and/or promotion in accordance with the exemplary process 1700 of FIG. 17. Embodiments of the invention are not limited to storing or editing any particular type of data in response to a transition or promotion, nor are embodiments of the invention limited to performing any specific act or acts related to a transition or promotion.

FIG. 18 shows an exemplary process 1800 for transitioning an issue in a workflow when the issue is promoted in the software project. The process 1800 begins in block 1802 when a user establishes a workflow for a software project. As in block 1702 of process 1700 (FIG. 17), this may be done in any manner, such as by loading a description of workflow stages and transitions from a file or accepting input from a user regarding workflow stages and transitions which should be implemented. Establishing a workflow for a software project may also comprise defining a software project with which a workflow will operate. In block 1804, a relationship is established between a transition in the workflow and a stream in the software project. The relationship of block 1804 may be established in any suitable manner, including the exemplary techniques discussed above. For example, a user may select the "Finish Dvt" transition in the workflow 508 of FIG. 6 and relate it to the user's workspace (e.g., set an originating stream for a promotion associated with the transition to be workspace 110 of version hierarchy 100A).

In block 1806, a user selects an issue to promote in a software project by selecting an issue in the originating stream (e.g., workspace 110) and selecting to promote the issue. Selecting to promote an issue may be done in any suitable manner, such as by selecting an issue in a list of issues associated with an originating stream (e.g., as shown in FIG. 9) and then selecting a button to promote the issues or by dragging the issue to the next stream in the stream hierarchy (i.e., the destination stream for the promote). In some embodiments of the invention, a stream may be adapted only to promote an issue to a single destination stream, for example, the next stream above the originating stream in a stream hierarchy, so a user need only select to promote an issue rather than selecting a stream to which to promote. Upon selection of an issue to promote from an originating stream, in block 1808, the process 1800 retrieves a data structure 1600 and determines whether the originating stream in the software project is related to a workflow transition. Upon examining records of data structure 1600 and determining that the workspace 110 is associated with the "Finish Dvt" transition, the process 1800 may promote the issue in the stream hierarchy, to the next higher stream (e.g., stream 106 of FIG. 1). Issue promotion may be done in any suitable manner, such as by changing a virtual version of a file in the destination stream (Project A (Dev't) 106) to correspond to indicate a real version of the file created in workspace 110, by adding a file to stream 106, applying a change package associated with the issue to stream 106, or by taking any other suitable action. After promoting the issue in the software project, the issue may be transitioned in the workflow in block 1812 by applying the transition to the issue. Block 1812 may comprise taking one or more actions associated with the issue (e.g., changing a value of a field, as shown in FIG. 11) and/or one or more actions associated with the destination stage of the issue (e.g., prompting a user for a value for a field required to be populated for issues in the stage). Once all actions associated with the workflow transition have been completed, and all files/changes associated with the issue in the software project have been applied to the destination stream, the process 1800 ends.

The exemplary data structures shown above in FIGS. 17A-17D, which show edits which may be made to data structures by some embodiments of the invention executing a process such as process 1700, also show the changes that may be made to data structures by execution of some embodiments of a process such as process 1800. Thus, an example of the type of changes made by process 1800 may be seen in the examples of FIGS. 17A-17D. It should be appreciated, however, that embodiments of the invention are not limited to performing any specific act or acts to transition an issue in a workflow when the issue is promoted in a software project, and thus embodiments of the invention are not limited to storing and/or editing any particular type or types of data when carrying out a process such as process 1800.

It should be appreciated that the exemplary processes 1700 and 1800 are merely illustrative of processes which may be implemented by embodiments of the invention to take advantage of defined relationships between workflow transitions and versions of software projects, and that other processes are possible. For example, processes may be implemented which interact with software project information stored in a format other than streams. Additionally, processes may be implemented which take greater or fewer indications of actions to be performed, such as accepting an indication of an issue to be promoted and a version to which to promote it rather than simply an indication of the issue. Additionally, processes may be implemented which do not comprise acts of establishing a workflow and establishing a relationship, but rather which rely on a default or predetermined workflow having defined relationships with a software project, or which infer relationships between a version hierarchy and a workflow based on properties of the hierarchy and the workflow.

Figure 19:
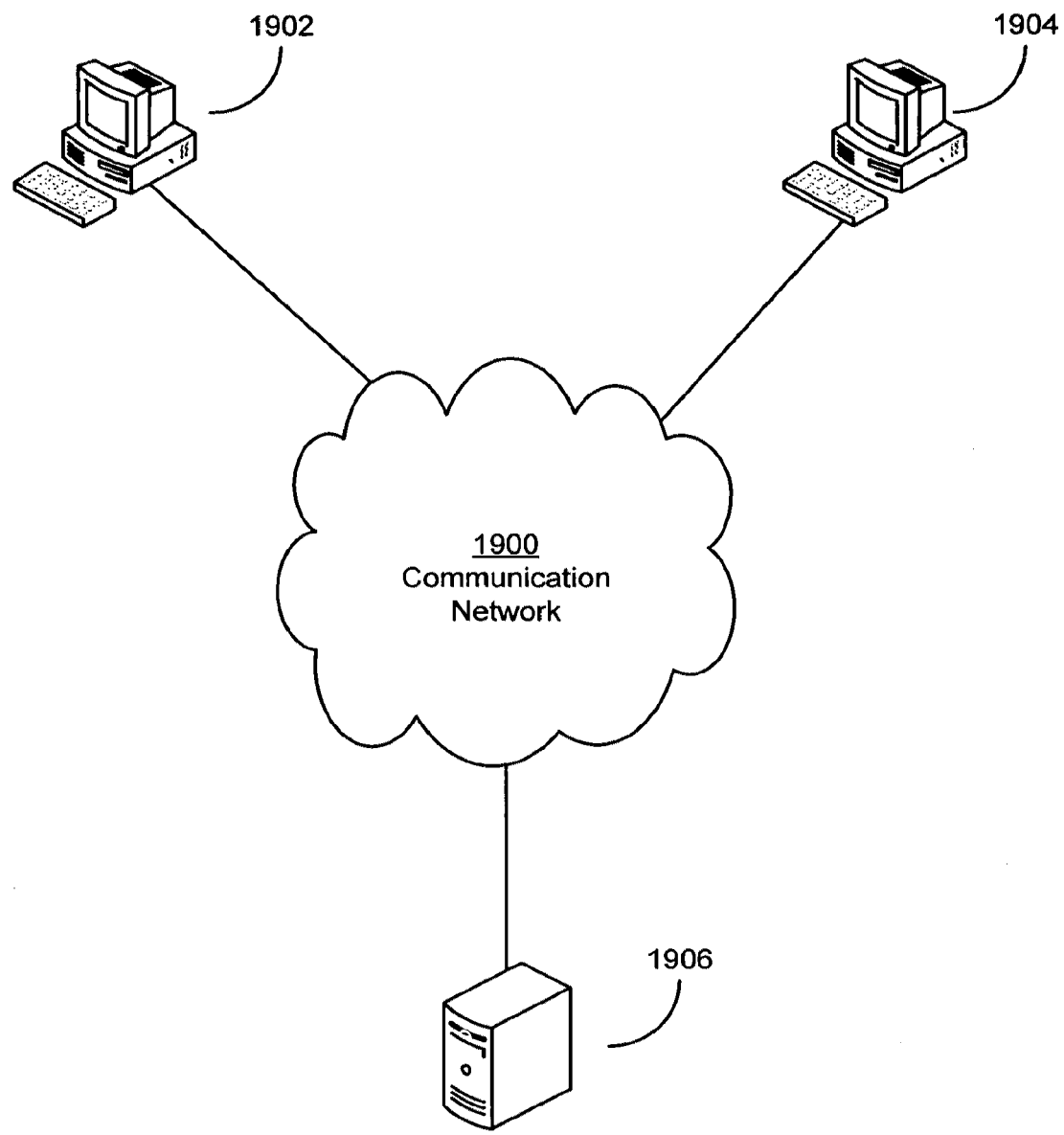
FIG. 19 is a diagram of an exemplary computer system in which embodiments of the invention may act.
Figure 20:
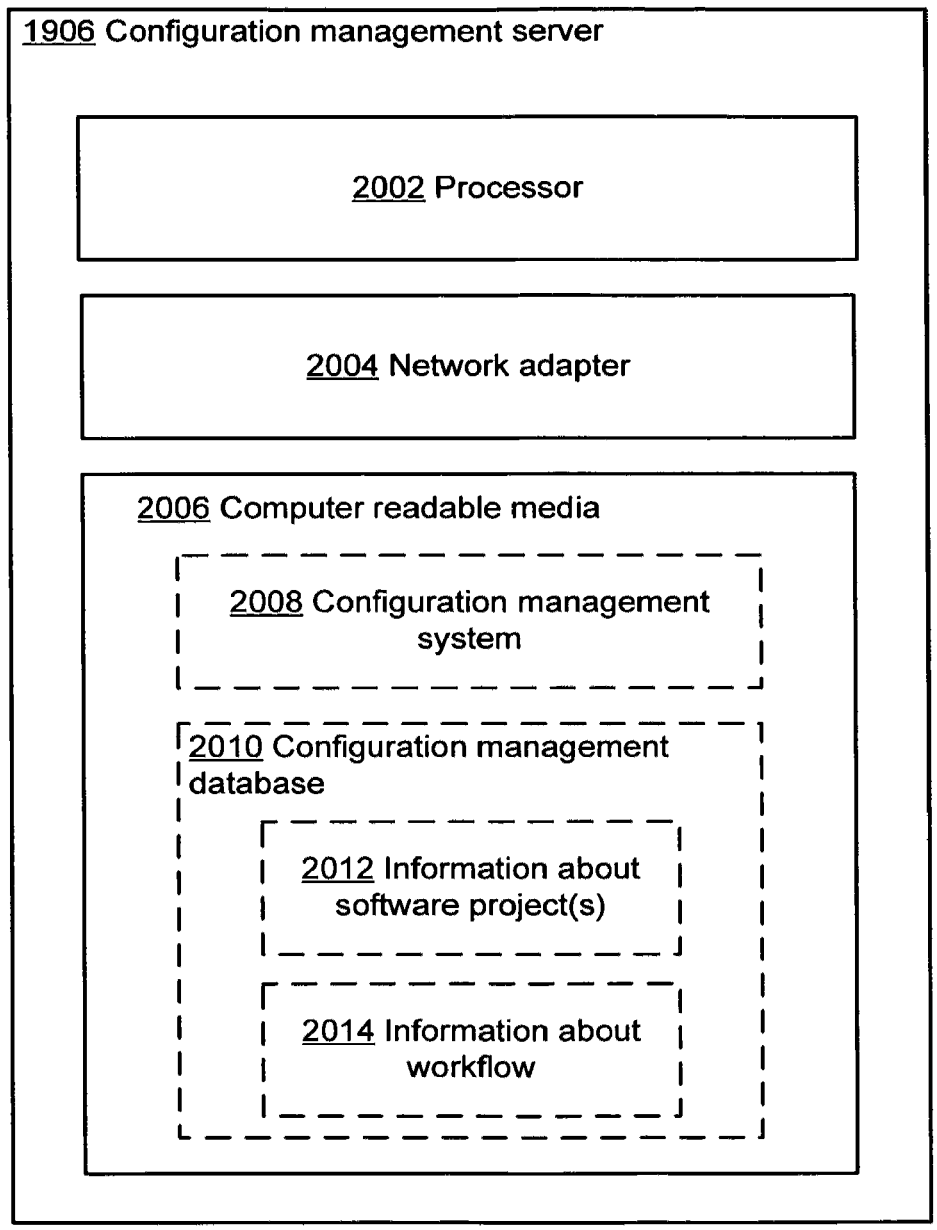
FIG. 20 is a block diagram of an exemplary content management server which may be implemented by embodiments of the invention.

The aspects of the present invention described herein may be implemented on any of numerous computer system configurations and are not limited to any particular type of configuration. FIGS. 19-20 show various computer systems in which embodiments of the invention may act, though others are possible.

FIG. 19 shows an illustrative computing system in which embodiments of the invention may be implemented. FIG. 19 shows two client computing devices 1902 and 1904 connected to a configuration management server 1906 through a communication network 1900. A client device such as client devices 1902 and 1904 may be a computing device designed for a single purpose or for multiple purposes and may be adapted for use by a user. Exemplary client devices include desktop personal computers, laptop personal computers, servers, personal digital assistants (PDA), smart/mobile telephones, or any other suitable electronic device. The client devices 1902 and 1904 may be adapted for use by a user of a CM application stored on at least one computer-readable media of the client device and executing on a processor of the client device, and may provide for the user to use the CM application to access content (e.g., software projects) managed by the CM application by communicating with a configuration management (CM) server 1906 through a communication network 1900. The communication network 1900 may be any suitable wired and/or wireless communication medium or media for exchanging data between two or more computers, including the Internet. For example, the computing network may be, at least in part, a wireless network operating according to any suitable wireless networking protocol, such as IEEE 802.11, GSM, Bluetooth, WiMAX, UWB, and/or any other suitable protocol, or may be, at least in part, a wired network operating according to any suitable wired networking protocol, such as Ethernet. A configuration management server 1906 may be any suitable computing device comprising In embodiments of the invention, a client device may not interact with a CM server 1906 through a communication network, but rather the client device may comprise the functionality of the CM server 1906 such that a CM application executing on the client device may be self-contained, without needing to access content from another computing device. In alternate embodiments of the invention, a client device may comprise a portion of the functionality of a CM server 1906 and the remaining functionality may be implemented on a stand-alone server accessible through a communication network, as in the exemplary computer system of FIG. 19.

Accordingly, while functionality of a CM server 1906 described below may be discussed in conjunction with a stand-alone server, it should be appreciated that some or all of the functionality may be implemented on a client device.

FIG. 20 shows an illustrative computing device which may be implemented as a CM server 1906 in accordance with embodiments of the invention. It should be appreciated that FIG. 20 is intended to be neither a depiction of necessary components for a computing device to operate as a server or a client device with embodiments of the invention, nor a comprehensive depiction.

CM server 1906 may comprise a processor 2002, a network adapter 2004, and computer-readable media 2006. Network adapter 2004 may be any suitable hardware and/or software to enable the CM server 1906 to communicate with any other suitable computing device over any suitable computing network. The computing network may be any suitable wired and/or wireless communication medium or media for exchanging data between two or more computers, including the Internet. For example, the computing network may be communication network 1900 Computer-readable media 2006 may be adapted to store data to be processed and/or instructions to be executed by processor 2002. Processor 2002 enables processing of data and execution of instructions. The data and instructions may be stored on the computer-readable media 2006 and may, for example, enable communication between components of the CM server 1906.

In accordance with some embodiments of the invention, the data and instructions stored on computer-readable media 2006 may comprise computer-executable instructions describing a configuration management system such as a CM application described above. The CM system 2008 may be adapted to permit users to interact with information stored in a configuration management database 2010 and maintain the records of the CM database 2010 and records of users' interactions with the CM database 2010. For example, when a user makes a change to a file in the CM database 2010, the CM system 2008 may create in the CM database 2010 an indicator that the user made a change, and store any metadata associated with the change (e.g., an issue related to the change). If a user makes a change related to a workflow, a version, or a relationship between a workflow and a version, then the CM system 2008 may also store indicators of those changes in the CM database 2010. CM database 2008 comprises information 2012 regarding one or more software projects managed by the CM system 2008, as well as information 2014 regarding a workflow managed by the CM system 2008. The CM database 2008 may additionally store any suitable information related to the information 2012, information 2014, and/or the CM system 2008, such as information relating versions of a software project to transitions of a workflow.

CM applications which implement some embodiments of the invention and/or some of the techniques outlined above may offer advantages to users of these CM applications which are not offered by conventional CM applications. It should be appreciated that while some of these advantages are offered by some embodiments of the invention, alternative embodiments of the invention may not offer all or some of these advantages or, indeed, any of these advantages. As an example of these advantages, users of such CM applications—for example, a software development manager, a software developer, or any other suitable user of a CM application—are no longer required to update and maintain records describing issues, as the status of issues may be determined from automatically recorded properties of the issue and not necessarily from an action of the user (e.g., an active updating or setting of a value). As an example of this advantage, an issue may be determined to have transitioned in a workflow and/or been propagated in a software project when a developer is initially assigned to resolve the issue. Rather than waiting for a user to take an action declaring that the issue is, for example, now "in progress" or "scheduled" instead of simply "new," a CM application may detect automatically that an issue has been assigned to a developer and transition the issue from "new" to "in progress" or "scheduled." Exemplary techniques for this automatic detection are discussed in detail below.

Additionally, and related to the first advantage, users are no longer required to update multiple records (e.g., records in a conventional CM application issue tracking system and records in a conventional workflow application), or records unassociated to the application the users are typically using. For instance, software developers may regularly interact with conventional CM applications to make changes to software components and propagate those software components, but may only interact with a conventional workflow application to update the status of an issue in the workflow. Thus, a user of a conventional CM application must halt his or her work, open up another application (e.g., a conventional workflow application), and perform status updates that some may consider redundant to status updates the user may have previously entered (e.g., updates to issue tracking records). Users of conventional CM applications may consider this non-ideal, and thus an advantage is offered by embodiments of the invention wherein a single CM application captures these different status values or data from which they can be determined.

Third, users of some embodiments of the invention which implement CM applications as described above may not only be able to update both a workflow status and a software project status of an issue in one application, but will also be able to determine an overall status of an issue from one application. In accordance with some embodiments of the invention, a CM application implemented as described above may permit a user to query a workflow maintained by the CM application to determine issues associated with stages of the workflow, and/or may be able to query a version of a software project to determine issues associated with that version. An advantage is offered to users of such CM applications because the users would be able to determine quickly and efficiently the overall status of an issue, both in a workflow (e.g., how far the issue has progressed in its lifecycle) and in a software project (e.g., how far the issue has progressed in a version hierarchy). Additionally, users of CM applications implemented by some embodiments of the invention would be able to determine from one source overall statuses of multiple issues, such that the users may compare the status of issues and make predictions about when groups of issues may be completed. In this way, a user may be able to make predictions and conclusions about a software development effort, such as predictions on when a software development effort may be completed.

It should be appreciated that these advantages are merely exemplary of advantages offered by illustrative embodiments of the invention, and that some embodiments of the invention may offer one or more of these advantages and may offer additional or alternative advantages to the ones discussed above.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for associating a workflow transition and a version of a software project, the workflow transition indicating a relationship between workflow stages of an associated workflow, the version of the software project including at least one software component, a status of at least one issue being identified by a workflow stage for the at least one issue, each issue of the at least one issue corresponding to a software development task and corresponding to one or more software components, the method comprising computer-implemented acts of:

A) accepting a first indication of the workflow transition of the associated workflow, said workflow transition to be associated with the version of the software project, such that a change is made to one or more software components of the version of the software project when the workflow transition is applied to an issue corresponding to the software components;

B) accepting a second indication of the version of a software project, wherein the version of the software project is to be associated with the workflow transition such that the workflow transition is applied to an issue when at least one software component of the version of the software project is promoted to a second version of the software project; and C) storing information in at least one computer-readable storage medium identifying a relationship between the workflow transition and the version, the relationship identifying the version as an originating version for software components to be promoted when the workflow transition is applied to an issue corresponding to the software components and identifying the workflow transition as an action to be taken on an issue when a software component corresponding to the issue is promoted from the version, wherein the at least one computer-readable storage medium stores information regarding the version as at least one data structure comprising information describing the version of the software project and describing the at least one software component included in the version of the software project.

2. The method of claim 1, further comprising accepting from a user an indication of the software project with which version is associated.

3. The method of claim 1, further comprising identifying a workflow for the software project, the workflow comprising a plurality of workflow stages and at least one workflow transition.

4. The method of claim 1, wherein the first indication and the second indication are accepted from a user.

5. The method of claim 4, wherein the first indication and the second indication are accepted from the user via a graphical user interface.

6. The method of claim 4, wherein the information stored in the at least one computer-readable storage medium comprises data accepted from the user as the first indication and the second indication.

7. The method of claim 1, wherein the version is implemented as a stream.

8. The method of claim 1, wherein the information is stored in an Extensible Markup Language (XML) file.

9. The method of claim 1, wherein the information is stored in a database.

10. The method of claim 1, wherein the acts of accepting the first indication, accepting the at least one second indication, and storing are performed via at least one processor.

11. The method of claim 1, wherein:
accepting the second indication comprises accepting a second indication of the version of the software project and the second version of the software project; and
storing the information in the at least one computer-readable storage medium identifying the relationship comprises storing information identifying the version as an originating version for software components to be promoted when the workflow transition is applied to an issue corresponding to the software components and identifying the second version as a destination version for the software components that are to be promoted when the workflow transition is applied.

12. The method of claim 11, wherein storing the information in the at least one computer-readable storage medium identifying the relationship comprises storing information identifying the workflow transition as an action to be taken on an issue when a software component corresponding to the issue is promoted from the version to the second version.

13. A computer-implemented method for transitioning an issue in a workflow of a software development effort based on a change made to at least one software component corresponding to the issue, the method comprising:
A) identifying as an originating version for a promotion operation a first version of a software project comprising the at least one software component corresponding to the issue and identifying as a destination version for the promotion operation a second version of the software project;
B) promoting the at least one software component such that the second version of the software project comprises the at least one software component;
C) determining whether the first version and/or the second version is associated with a workflow transition such that the workflow transition should be applied when a promotion involving the first version and/or the second version is carried out; and
D) when the first version and/or the second version is associated with a workflow transition, applying the associated workflow transition to the issue to transition the issue in the workflow from a first workflow stage to a second workflow stage, wherein applying the associated workflow transition comprises editing a workflow status for the issue stored in at least one computer-readable storage medium,
wherein the at least one computer-readable storage medium stores information regarding the first version as at least one data structure comprising information describing the first version of the software project and describing the at least one software component included in the first version of the software project.

14. The method of claim 13, wherein editing the workflow status of the issue comprises writing values to one or more fields of a data structure associated with the issue.

15. The method of claim 14, wherein writing values to one or more fields of a data structure associated with the issue comprises editing a value stored in a field of the one or more fields.

16. The method of claim 13, wherein promoting the at least one software component comprises editing at least one software component data structure associated with the at least one software component to indicate that the software component is included in the second version.

17. The method of claim 13, wherein the first version is implemented as a stream.

18. The method of claim 13, wherein the acts of identifying, promoting, determining, and applying are performed via at least one processor.

19. A computer-implemented method for promoting at least one software component from a first version of a software project to a second version of the software project based on a change made to an issue to which the at least one software component corresponds, the method comprising:
A) applying a workflow transition to the issue to move the issue from a first workflow stage of the workflow to a second workflow stage of the workflow;
B) determining whether the workflow transition is associated with a first version of the software project and/or a second version of the software project such that a promotion operation should be performed using the first version as an originating version and/or the second version as a destination version when the workflow transition is applied; and
C) when it is determined that the workflow transition is associated with the first version and/or the second version of the software project, promoting at least one software component corresponding to the issue from the first version to the second version of the software project such that the second version of the software project comprises the at least one software component, wherein promoting the at least one software component comprises editing at least one data structure, stored in at least one computer-readable storage medium, that stores information regarding a version of the software project that includes the at least one software component,
wherein the at least one computer-readable storage medium stores information regarding the first version as at least one data structure comprising information describing the first version of the software project and describing the at least one software component included in the first version of the software project.

20. The method of claim 19, wherein promoting the at least one software component from the first version to the second version of the software project comprises associating in a data structure the at least one software component with the second version of the software project.

21. The method of claim 20, wherein associating in a data structure the at least one component with the second version of the software project comprises editing at least one software component data structure associated with the at least one software component to indicate that the software component is included in the second version.

22. The method of claim 19, wherein applying the workflow transition to the issue comprises:
retrieving from the at least one computer-readable storage medium first information regarding at least one action to be taken when the workflow transition is applied, wherein the at least one action comprises prompting a user for a value of a property of the issue.

23. The method of claim 22, wherein the property is an assigned user for the issue and the value is an indicator of the user to which the issue is assigned.

24. The method of claim 19, wherein promoting at least one software component from the first version to the second version comprises associating the at least one software component with a version of the software project one hierarchical level above the first version that is associated with the workflow transition.

25. The method of claim 19, wherein the first version is implemented as a stream.

26. The method of claim 19, wherein the acts of applying, determining, and promoting are performed via at least one processor.

27. An apparatus for use in managing a software development effort, the software development effort comprising a plurality of software components associated with a plurality of versions of a software project, each of the plurality of versions comprising an instance of at least one software component, the software development effort further comprising one or more issues associated with a workflow, each said issue of the one or more issues corresponding to a software development task to be performed for the software development effort and corresponding to one or more software components of the plurality of software components related to the software development task, wherein the workflow associated with the one or more issues includes a plurality of workflow stages and one or more workflow transitions indicating a relationship between workflow stages and each issue is associated with a workflow stage, the apparatus comprising:
    at least one processor; and
    at least one computer-readable medium storing information comprising processor-executable instructions and data, the data identifying a relationship between a first workflow transition of the one or more workflow transitions and a first and second version of the plurality of versions of the software project,
    wherein the data identifies a first version of the software project as a source for software components to be promoted to a second version of the software project when a first workflow transition is applied to an issue that corresponds to the software components and identifies the first workflow transition as an action to be taken on the issue corresponding to the software components when the software components of the first version are promoted to the second version, and
    wherein the processor-executable instructions, when executed by the at least one processor, cause the at least one processor to carry out a method, the method comprising
        (a) upon detecting a promotion operation that promotes the software components of the first version to the second version, determining, from a review of the data of the at least one computer-readable medium, that the first workflow transition is an action to be taken when software components of the first version are promoted and, in response to the determining, applying the first workflow transition to the issue corresponding to the software components, and
        (b) upon detecting a transition operation that applies a workflow transition to the issue, determining, from a review of the data of the at least one computer-readable medium, that software components of the first version should be promoted to the second version when the first workflow transition is applied and, in response to the determining, promoting the software components corresponding to the issue from the first version to the second version.

28. The apparatus of claim 27, wherein the method further comprises:
    receiving input from a user identifying the relationship between first workflow transition, the first version, and the second version.

29. The apparatus of claim 27, wherein promoting the software components corresponding to the issue comprises associating in a data structure the software components corresponding to the issue with the second version of the software project different from the first version.

30. The apparatus of claim 27, wherein applying the first workflow transition to the issue comprises writing values to one or more fields of a data structure stored in the at least one computer-readable medium and associated with the issue.

31. The apparatus of claim 27, wherein the data stored on the at least one computer-readable medium further comprises first information describing at least one version of the software project and second information describing a workflow associated with the workflow transition.

* * * * *